(12) United States Patent
Bassalleck et al.

(10) Patent No.: US 12,482,998 B1
(45) Date of Patent: Nov. 25, 2025

(54) QUICK CONNECTION SYSTEM FOR ENERGY STORAGE AND PHOTOVOLTAIC EQUIPMENT

(71) Applicant: Gridworks, Inc., Albuquerque, NM (US)

(72) Inventors: Kevin Bassalleck, Albuquerque, NM (US); Dustin Neel, Albuquerque, NM (US)

(73) Assignee: Gridworks, Inc., Albuquerque, NM (US)

( * ) Notice: Subject to any disclaimer, the term of this patent is extended or adjusted under 35 U.S.C. 154(b) by 0 days.

(21) Appl. No.: 18/418,821

(22) Filed: Jan. 22, 2024

Related U.S. Application Data

(63) Continuation of application No. 17/993,746, filed on Nov. 23, 2022, now Pat. No. 11,881,672.

(60) Provisional application No. 63/282,817, filed on Nov. 24, 2021.

(51) Int. Cl.
| | |
|---|---|
| *H01R 43/26* | (2006.01) |
| *H01R 13/52* | (2006.01) |
| *H01R 31/06* | (2006.01) |
| *H02J 3/38* | (2006.01) |
| *H02J 7/35* | (2006.01) |

(52) U.S. Cl.
CPC ......... *H01R 43/26* (2013.01); *H01R 13/5221* (2013.01); *H01R 31/06* (2013.01); *H02J 3/381* (2013.01); *H02J 7/35* (2013.01); *H02J 2300/24* (2020.01); *Y10T 29/49169* (2015.01)

(58) Field of Classification Search
CPC .......... H02S 40/32; H02S 40/36; H02S 30/10; H02S 40/34; H01L 31/02008; H01R 43/26; Y10T 29/49169

USPC .................. 29/854, 729, 745, 850, 857, 868
See application file for complete search history.

(56) References Cited

U.S. PATENT DOCUMENTS

| | | | |
|---|---|---|---|
| 10,020,754 | B2 | 7/2018 | Chapman et al. |
| 10,333,340 | B2 | 6/2019 | Kang et al. |
| 10,765,015 | B2 | 9/2020 | Linderman |
| 10,938,218 | B2 | 3/2021 | Jeanty et al. |

(Continued)

FOREIGN PATENT DOCUMENTS

| | | | | |
|---|---|---|---|---|
| CN | 108092316 B | | 5/2020 | |
| CN | 214673871 U | | 11/2021 | |
| DE | 102012014695 | * | 1/2014 | ............... H02G 3/16 |

(Continued)

OTHER PUBLICATIONS

"You picked your panels—how do you finalize and install your residential solar system?", https://www.dcbel.energy/2021/08/05/you-picked-your-panels-how-do-you-finalize-and-install-yourresidential-solar-system/, 1-7.

*Primary Examiner* — Thiem D Phan
(74) *Attorney, Agent, or Firm* — Peacock Law P.C.; Justin R. Muehlmeyer; Daniel J. Berenger-Russell

(57) ABSTRACT

Systems and methods of electrically connecting electrical energy storage or photovoltaic equipment with electrical destination equipment without performing any hard-wiring or installing any terminations in the field. A utility-scale electrical energy storage system and/or photovoltaic inverter is provided with a receptacle at its electrical output with a frame shaped and sized to secure to a first plug on a first cable to form an electrical connection between the first source equipment, first cable and the destination equipment.

10 Claims, 23 Drawing Sheets

(56) References Cited

U.S. PATENT DOCUMENTS 11,018,619 B2    5/2021   Torrano Carrillo et al.
2021/0070185 A1    3/2021   Liu et al.

FOREIGN PATENT DOCUMENTS

ES          1257111 U    11/2020
WO    2021047389 A1    3/2021

\* cited by examiner

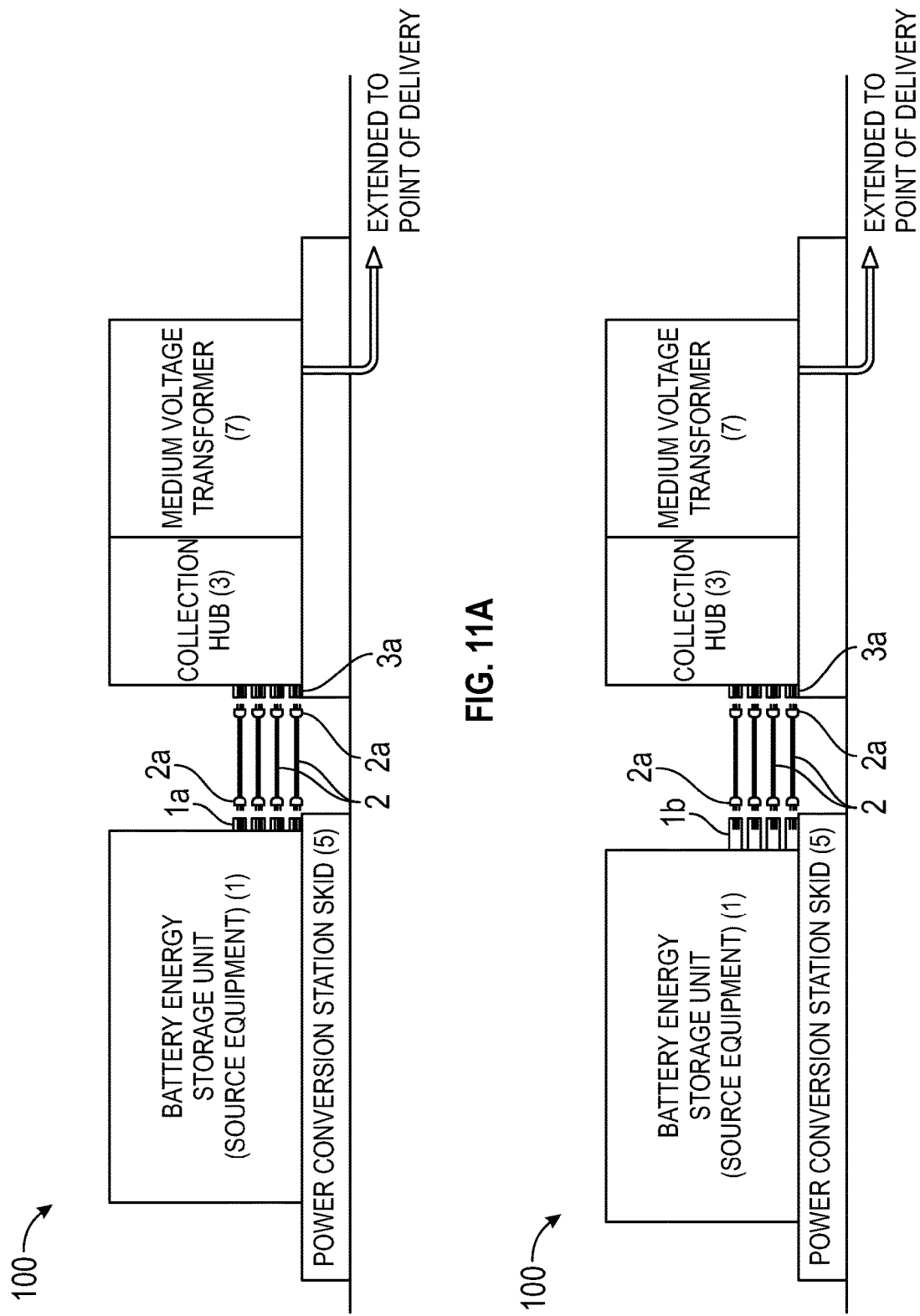

QUICK CONNECTION SYSTEM FOR ENERGY STORAGE AND PHOTOVOLTAIC EQUIPMENT

CROSS-REFERENCE TO RELATED APPLICATIONS

This application is a continuation of U.S. patent application Ser. No. 17/993,746, entitled "Quick Connection System for Solar Photovoltaic Equipment", filed on Nov. 23, 2022, which claims priority to and the benefit of the filing of U.S. Provisional Patent Application No. 63/282,817, entitled "Quick Connection System for Solar Photovoltaic Equipment", filed on Nov. 24, 2021, and the specification thereof is incorporated herein by reference.

BACKGROUND OF THE INVENTION

Field of the Invention

Embodiments of the present invention are directed to systems and methods of electrically connecting electrical energy storage equipment and/or solar photovoltaic ("PV") collection equipment with electrical destination equipment at a large-scale power facility without the need for hard-wiring in the field, and more particularly, systems for providing receptacles on source equipment and plugs on cables that enable installers to electrically connect utility-scale electrical power equipment.

Description of Related Art

With the growing demand for renewable energy and energy storage has come the need for a quickly deployable solution to greatly reduce the costly need for extensive on-site construction means, methods and labor in order to integrate electrical energy storage systems or renewable energy sources and that easily connects with electric grid infrastructure.

Large-scale electrical energy storage units are delivered to a power facility to be connected to the power facility's destination equipment, often at great expense and complexity due to the need for licensed electricians to need to be deployed to make electrical terminations between the equipment in the field at the power facility itself. In the case of power generation facilities, typical large-scale solar energy generation facilities utilize distributed equipment within an array of solar PV modules to collect direct current ("DC") energy before converting it to alternating current ("AC") energy in such a method as it can be delivered to a single point of delivery on the site. This can be either DC combining equipment, which parallels the DC generation back to a common, centralized point of conversion, or it can be a distributed version of power conversion, for example a 3-phase string inverter, which then is collected back at a common centralized point in AC switchgear. In any of these examples, the distributed electrical energy storage units, the electrical equipment that aggregates multiple DC energy generation equipment or smaller distributed inverters shall hereinafter be referred to as "source equipment" as further defined in this application and in the claims.

Source equipment needs to be connected to the various other electrical energy systems at the power facility, including but not limited to electrical transformers, centralized inverters, switchgear, metering equipment, etc. (hereinafter referred to as "destination equipment" as will be further defined in this application and in the claims). Installing source equipment at the site and connecting the source equipment to the destination equipment is a costly effort, requiring trenches to be dug, cables and raceways to be installed and sensitive field terminations to be made by skilled labor with specialized equipment and training. Typical sites are often isolated and remote from population centers, presenting significant challenges to staff the projects with experienced, specialized trade labor (e.g., licensed electricians).

An example of a traditional electrical connection system in a typical solar generation facility is illustrated in FIG. 1 and in FIG. 2. In a traditional PV power plant design, the electrical connection system has a large quantity of electrical conductors in conduit raceways, direct-buried in trenches underground or strung from messenger cable systems. These traditional systems collect electrical energy from the solar PV modules, aggregate solar PV module circuits through source equipment and destination equipment, and convert the DC energy from the source equipment to AC energy at either the destination equipment or source equipment, depending on the design. Regardless of the design, traditional PV plants rely on a large amount of field fabrication with trade technicians, electricians, apprentices, etc. That is in part due to the fact that, as shown in FIGS. 1 and 2, each source equipment is wired directly to, and terminated with, the destination equipment. This places undue labor challenges and inefficiency into the construction process for a typical solar PV plant. Each conductor needs to be tested, and various methods of stripping cable insulation, crimping connectors or lugs onto the cable, and/or terminating the cable into lugs is required in the field for project construction. The same is true for component replacement or repair during the operations and maintenance phase of a project.

What is needed is a system that provides source equipment with a receptacle so that destination equipment can be electrically connected to it by simply plugging a cable into the source equipment receptacle without the need to perform technical electrical work to make the connection.

BRIEF SUMMARY OF EMBODIMENTS OF THE PRESENT INVENTION

One of the objectives of the present invention is to provide source equipment that is ready for electrical connection to destination equipment without the need for any hard-wiring or electrical terminations to be performed in the field at the power facility. Another objective of the present invention is to provide such an assembly that can be quickly deployed and adapted to a multitude of varying site conditions.

Embodiments of the present invention are directed to a method of electrically connecting electrical energy storage or photovoltaic equipment with electrical destination equipment, the method including the step of providing a first receptacle at the electrical output of a first source equipment, the first source equipment including an electrical energy storage system with capacity of at least about 1,000 kWh or a photovoltaic inverter of at least about 100 kW, the first receptacle including a frame shaped and sized to secure to a first plug on a first cable to form an electrical connection between the first source equipment and the first cable. The source equipment is subsequently delivering or otherwise provided to an electric power generation or storage facility ("power facility") including destination equipment, the destination equipment including at least one of the electrical equipment chosen from the group consisting of: transformer, inverter, switch, switch gear, panel board, circuit breaker and meter. A first cable is provided including a first plug on a first end of the first cable, the first plug including a frame shaped and sized to secure to the first receptacle and including at least two conductors, to form an electrical connection between the first source equipment and the first cable. The first cable is electrically connected to the first source equipment by securing the first plug to the first receptacle on the first source equipment to form an electrical connection between the destination equipment and the first cable. The step of electrically connecting the first cable to the first source equipment is preferably accomplished without performing any hard-wiring or installing any terminations on the first cable, first source equipment or destination equipment while at the power facility. The step of electrically connecting the first cable to the first source equipment is preferably accomplished without adding any lugs to the first cable, first source equipment or destination equipment while at the power facility. The step of electrically connecting the first cable to the first source equipment is preferably accomplished without using a hand tool.

Embodiments of the present invention are directed to a collection hub. A second plug may be provided on a second end of the first cable. A collection hub is provided including at least two input receptacles, the first input receptacle of the at least two input receptacles including a frame shaped and sized to secure to the second plug on the first cable to form an electrical connection with the first source equipment and the second input receptacle of the at least two input receptacles including a frame shaped and sized to secure to a plug on a second cable to form an electrical connection with a second source equipment, the second source equipment including an electrical energy storage system with capacity of at least about 100 kWh or a photovoltaic inverter of at least about 100 kW, and the collection hub including an electrical output electrically connected to the at least two input receptacles. The output of the collection hub may be electrically connected with a first receptacle on the destination equipment using a second cable. The second cable may be buried in the ground, or at least a portion of its length.

In another embodiment, the collection hub is physically integrated with or disposed on the destination equipment. The destination equipment and collection hub are both secured on a skid shaped and sized to support the destination equipment and collection hub off the ground, and the collection hub is electrically connected with the destination equipment. The destination equipment preferably includes all electrical equipment necessary to connect the collection hub to a point of delivery of the electric power provided by the power facility.

Embodiments of the present invention are directed to receptacles that coordinate with the plugs of the invention to prevent incorrect connections, to lock and/or to seal against dust and water. The frame of the first receptacle and the frame of the first plug on the first cable may comprise an asymmetrical shape. The frame of the first receptacle and the frame of the first plug on the first cable may comprise a tab or slot. The receptacle and/or first plug may be shaped and sized so as to require a hand tool to remove or unsecure the first plug from the receptacle. The frame of the first receptacle and the frame of the first plug may comprise a shape that when the first plug is secured to the first receptacle, seals the connection against water and dust.

Embodiments of the present invention are directed to a ground support unit that supports source equipment off of the ground and coordinates with the cables, receptacles and plugs of the present invention to enhance ease of installation. A first ground support unit is provided including a top, bottom, first end and second end, the first ground support unit capable of supporting the first source equipment to be disposed on the top of the ground support unit, wherein the ground support unit includes a first member and a second member, the members spaced from each other to form a cavity extending entirely along the length of the first ground support unit between the first end and the second end and between the members, and a cable adaptor disposed on the first ground support unit, the cable adaptor extending at least partially below the top of the first ground support unit and disposed at least partially within the cavity, wherein the first receptacle of the first source equipment is disposed on the cable adaptor. A first cable is provided including a first plug on a first end of the first cable, the first plug including a frame shaped and sized to secure to the first receptacle on the cable adaptor and including at least two conductors, to form an electrical connection between the first source equipment and the first cable. Destination equipment is preferably disposed on a skid, the destination equipment including at least one of the electrical equipment chosen from the group consisting of: transformers, inverters, switch gear, and meters and the second end of the first cable is electrically connected with the destination equipment. The destination equipment is preferably disposed on the skid to an electric power generation or storage facility ("power facility"), the first source equipment delivered to the power facility, and the first cable extended from the destination equipment to the first source equipment and plugging the first plug into the first receptacle.

Embodiments of the present invention are also directed to systems as well as methods. A system for electrically connecting electrical energy storage or photovoltaic equipment with electrical destination equipment includes: a first source equipment, the first source equipment including an electrical energy storage system with capacity of at least about 1,000 kWh or a photovoltaic inverter of at least about 100 kW; and a first receptacle at the electrical output of the first source equipment, the first receptacle including a frame shaped and sized to secure to a first plug on a first cable to form an electrical connection between the first source equipment and the first cable. The system may further include: a first cable including a first plug on a first end of the first cable, the first plug including a frame shaped and sized to secure to the first receptacle and including at least two conductors, to form an electrical connection between the first source equipment and the first cable; destination equipment including at least one of the electrical equipment chosen from the group consisting of: transformer, inverter, switch, switch gear, panel board, circuit breaker and meter; and the first cable electrically connected or connectable to the destination equipment.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention.

The drawings are only for the purpose of illustrating one or more embodiments of the invention and are not to be construed as limiting the invention. In the drawings:

FIGS. 11A and 11B are diagrammatic illustrations of an assembly in which a collection hub is disposed on a power conversion station skid and the source equipment is a battery energy storage unit, according to an embodiment of the present invention, FIG. 11A illustrating a receptacle on the source equipment and FIG. 11B illustrating an adaptor on the source equipment;

DETAILED DESCRIPTION OF THE INVENTION

Figure 1:
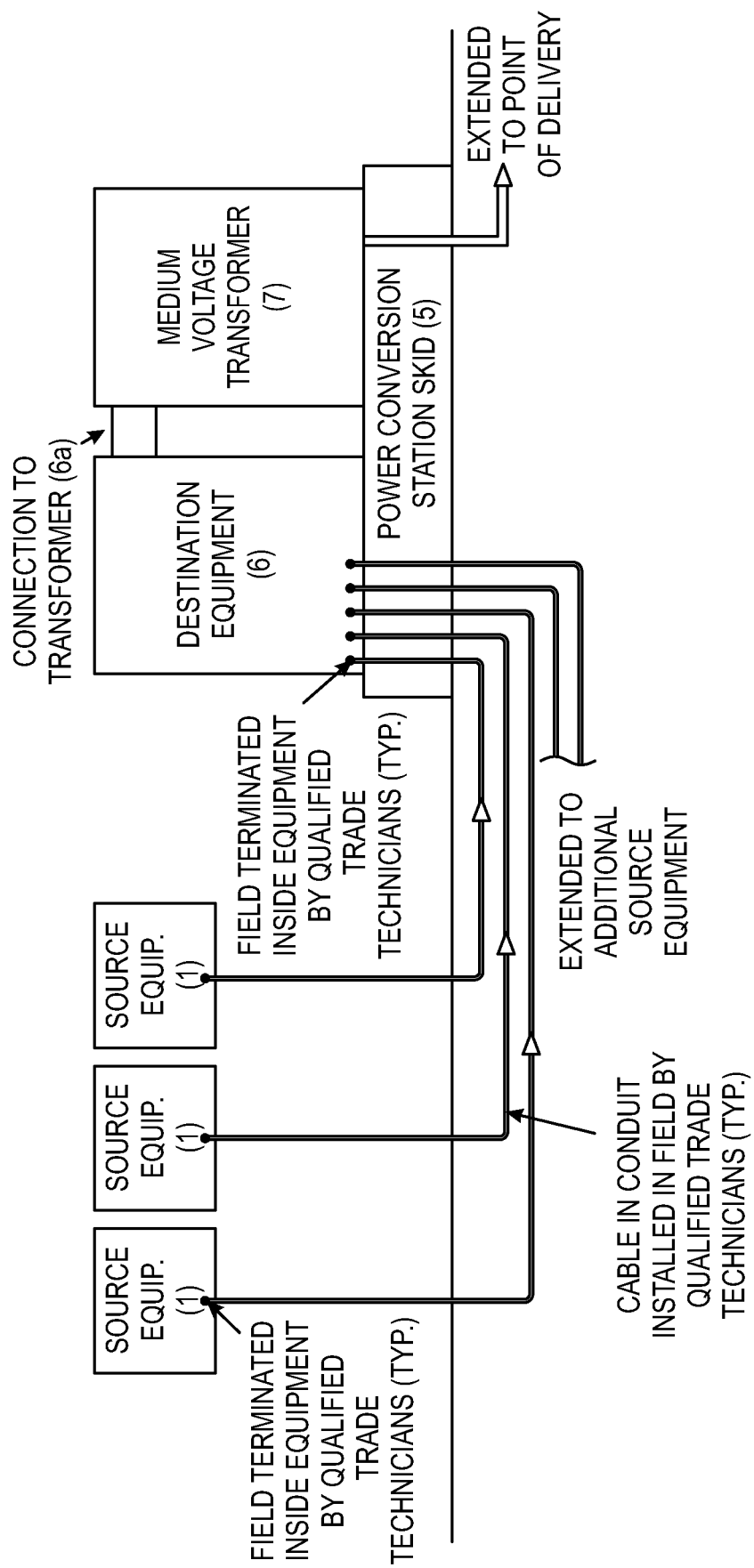
FIG. 1 is a diagrammatic illustration of a completed installation of an assembly according to the traditional methods of designing and installing a PV plant, showing the various equipment all connected and installed with the various conduits that need to be installed in the field, generally in trenches, with many conductors pulled through them and intricate electrical termination of the cables that requires certified electricians to accomplish.

For purposes of describing orientation and placement of various objects described herein, the "top" of an object refers to that side or surface of an object furthest from the ground. The "bottom" of an object is the side or surface opposite the top surface and closest to the ground. The terms "power facility" and "power generation facility" are used interchangeable to mean any facility with means for generating electric power or for storing electrical power. While it is solar power generation facilities that are described in relation to some of the figures herein, the invention is not limited to solar power generation facilities unless otherwise limited as such in the claims. As used herein, the terms "fabricated", "manufactured" or "assembled" are not distinct concepts and are used interchangeably, unless specifically stated otherwise. The terms "assembly" and "system" are used interchangeably, unless specifically stated otherwise. As used herein, the terms "energy" and "power" are used interchangeably. As used herein, the terms "cable" and "conduit" may be used interchangeably for ease of discussion. While a conduit is a channel or tube in which a cable or wire travels, the cable and conduit are often referred to together in the industry to refer either to the cable and conduit combination or sometimes even only the cable. Any use of either the term "cable" or "conduit" is not intended to be mutually exclusive of the other.

Referring to the figures, system 100 electrically connects source equipment 1 to destination equipment 6 through collection hub 3 or a plurality of collection hubs 3 and the various other features described herein. One of the objectives of system 100 is to provide a "plug and play" system capable of making some or all of the connections between source equipment 1, collection hub 3 and destination equipment 6 with locking receptacles and plugs. The terms "source equipment" and "destination equipment" are further defined herein.

The System Generally

Figure 3:
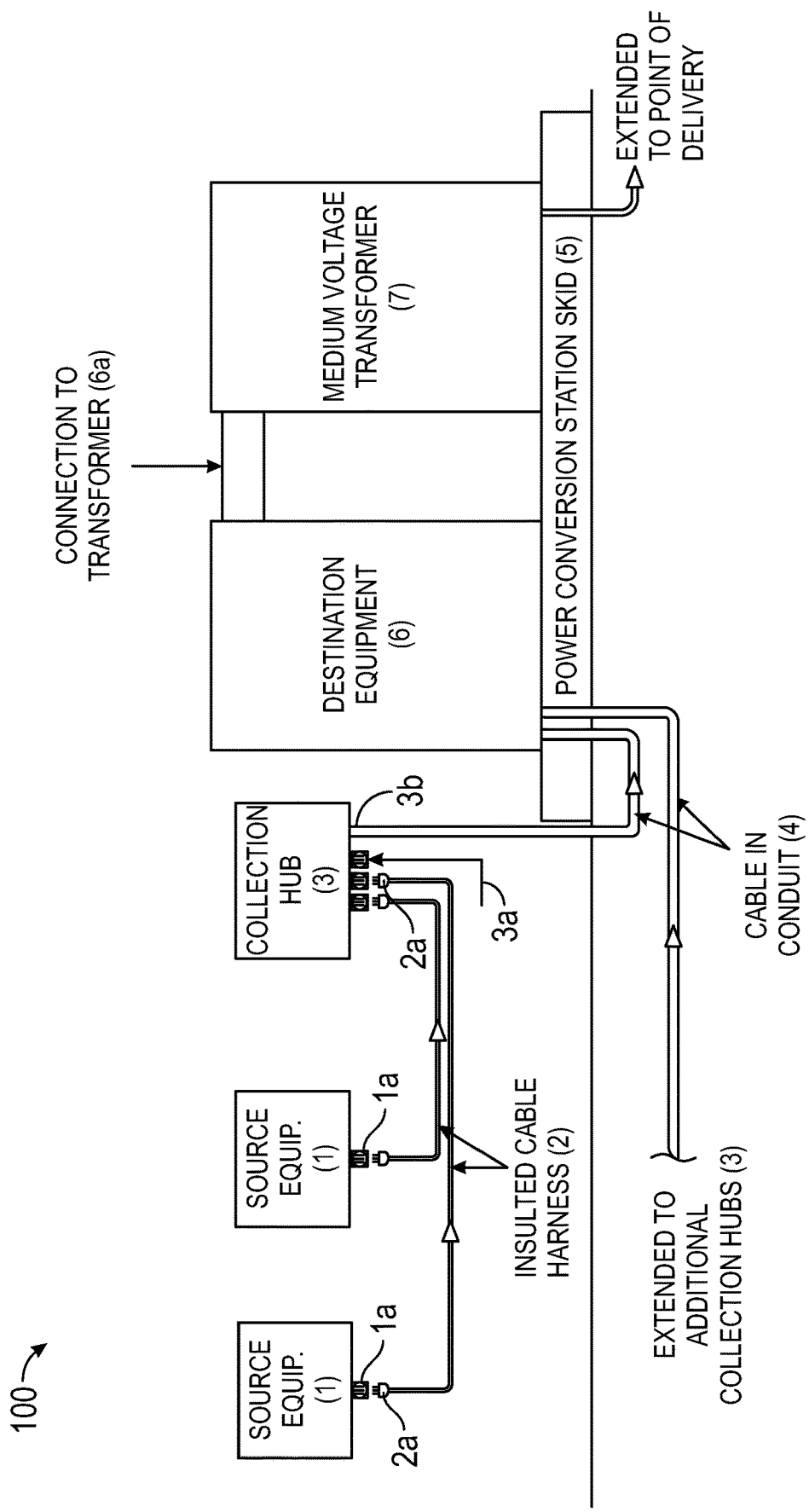
FIG. 3 is a diagrammatic illustration of a completed installation of an assembly according to an embodiment of the present invention, showing the assembly extending from source equipment and connecting it to destination equipment through a collection hub.
Figure 4:
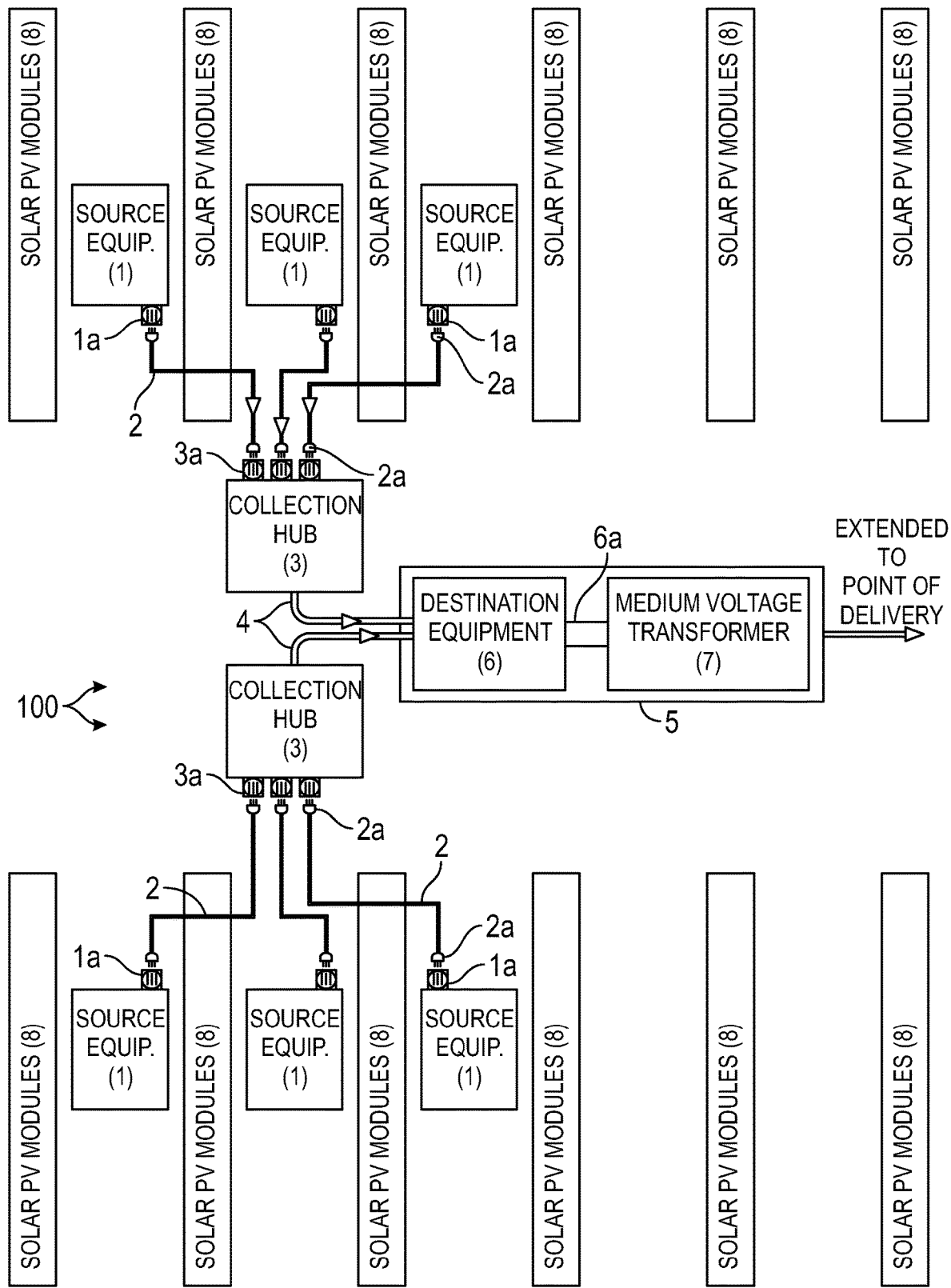
FIG. 4 is a diagrammatic illustration of a plurality of assemblies distributed within a PV array, according to an embodiment of the present invention.

FIG. 3 is a schematic illustrating system 100 as used in a solar power generation facility of solar PV modules according to an embodiment of the present invention. The DC power generated by solar PV modules is collected at source equipment 1. Source equipment 1 comprises DC combining equipment and/or string inverter equipment, depending on whether the solar power generation facility collects DC energy before converting it to AC energy at a single common point of conversion for the entire facility or whether the facility uses inverters to convert to AC power before collecting it at a single common point with AC switchgear. In one embodiment, source equipment 1 comprises a photovoltaic inverter of at least about 100 kW. Whatever the case, source equipment 1 is preferably disposed at or near each solar PV module or at or near the end of a row of PV modules, for example as illustrated in FIG. 4.

One of the objectives of the invention is to provide a system that efficiently collects the power from each source equipment 1 that may exist in the facility. In the example of FIG. 3, there happens to be two source equipment 1 located at or near the end of two separate rows of solar PV modules at a solar power generation facility. The output of each source equipment 1 comprises receptacle 1a that coordinates with first plug 2a of cable 2. Cable 2 extends from first plug 2a to its second end comprising second plug 2a. Second plug 2a coordinates with receptacle 3a of collection hub 3, thereby electrically connecting source equipment 1 to collection hub 3 at receptacle 3a. The details of source equipment 1 will be discussed further herein in relation to FIG. 5.

Collection hub 3 may comprise any number of receptacles 3a depending on the number of source equipment 1 that is intended to be coordinated. In the example of FIG. 3, collection hub 3 comprises three receptacles 3a, two of which connect with each of the two source equipment 1. Collection hub 3 collects the power outputs of each of the two source equipment 1 in a single hub that comprises output 3b that preferably combines the outputs of all the source equipment 1. Output 3b of collection hub 3 is electrically connected to destination equipment 6 via cable 4. The details of collection hub 3 will be discussed further herein in relation to FIG. 6.

Likely, destination equipment 6 is much further away from collection hub 3 than is source equipment 1 such that cable 4 would need to cross any number of vehicle roads, PV modules or other obstacles. For this reason, cable 4 preferably travels underground until it reaches or is closer to destination equipment 6. Destination equipment 6 comprises the much larger and more complex equipment involved with final delivery of the power out of the solar power generation facility, for example electrical transformers, centralized inverters, switchgear, metering equipment, etc.

While FIG. 3 illustrates a system with a single collection hub 3, destination equipment 6 may receive power from a plurality of collection hubs 3 through a plurality of cables 4, for example as illustrated in FIG. 4. It is destination equipment 6, along with any other final equipment such as medium voltage transformer 7, that provides the output for the entire solar power generation facility for delivery to power transmission systems and users. Destination equipment 6 is preferably disposed on power conversion station skid 5. By providing at least destination equipment 6 (and in some embodiments, collection hub 3 as well), integrated onto power conversion station skid 5, system 100 can be pre-fabricated and delivered to the power generation facility to simply be rolled out and plugged in. This will be discussed in further detail herein, for example in reference to FIG. 7.

System 100 may be referred to herein as an "assembly". Sometimes this application may refer to a "single assembly" of system 100 when such assembly is intended to be referred to as a single unit in a system 100 that comprises a plurality of assemblies. For example, system 100 illustrated in FIG. 3 comprises a single power conversion station skid 5, a single collection hub 3 and any number of source equipment 1 that may be electrically connected with it and all the various connections illustrated in FIG. 3. The system 100 illustrated in FIG. 3 may be referred to as a single assembly or a first assembly for purposes of describing a system 100 that comprises a plurality of assemblies. In some embodiments, a single assembly may refer to system 100 comprising all of the components described herein as would be used with a single power conversion station skid 5 and either a single collection hub 3 or a plurality of collection hubs 3. Note also that, as used herein, the term "block" may be used interchangeably with the term "assembly".

Large-scale solar power generation facilities typically have numerous solar PV modules oriented in rows, for example as illustrated in FIG. 4 illustrating a solar power generation facility comprising a plurality of rows 8 of solar PV modules, rows 8 being organized into two separate arrays of five rows 8 each. A solar power generation facility may have any number of solar PV modules organized into any number of rows 8 and arrays, the numbers depending on the desired power output of the facility and the groupings depending on how efficiently the space can be used. The present invention may comprise any number of collection hubs 3, source equipment 1, cables 4, cables 2, receptacles 3a and plugs 2a, depending on the size and/or desired output of the solar power generation facility.

FIG. 4 illustrates a system comprising two collection hubs 3, wherein the first collection hub 3 is disposed at or near the first array of solar PV modules to receive power from source equipment 1 at or near the first array, and the second collection hub 3 disposed at or near the second array of solar PV modules to receive power from source equipment 1 at or near the second array. The system of FIG. 4 coordinates the outputs of both the first and second collection hubs 3 to a single destination equipment 6, which single destination equipment 6 serves to output all of the power from the entire solar power generation facility.

As a matter of clarity, this application may refer to multiple "assemblies" of the system of the present invention, where an "assembly" represents some basic unit of the system. For example, system 100 illustrated in FIG. 3 may be referred to herein as a single assembly of system 100. In that sense, the word "assembly" as used herein shall refer to that unit of the system comprising a single collection hub 3 and at least one source equipment 1 connected to the collection hub 3 via cable 2 and receptacles 1a and plugs 2a along with cable 4 connecting collection hub 3 to destination equipment 6. In another sense, the system 100 illustrated in FIG. 4 may be referred to as comprising two assemblies. Alternatively, the system 100 illustrated in FIG. 4 may be described as a single system 100 comprising two collection hubs 3.

Source Equipment 1

Figure 5:
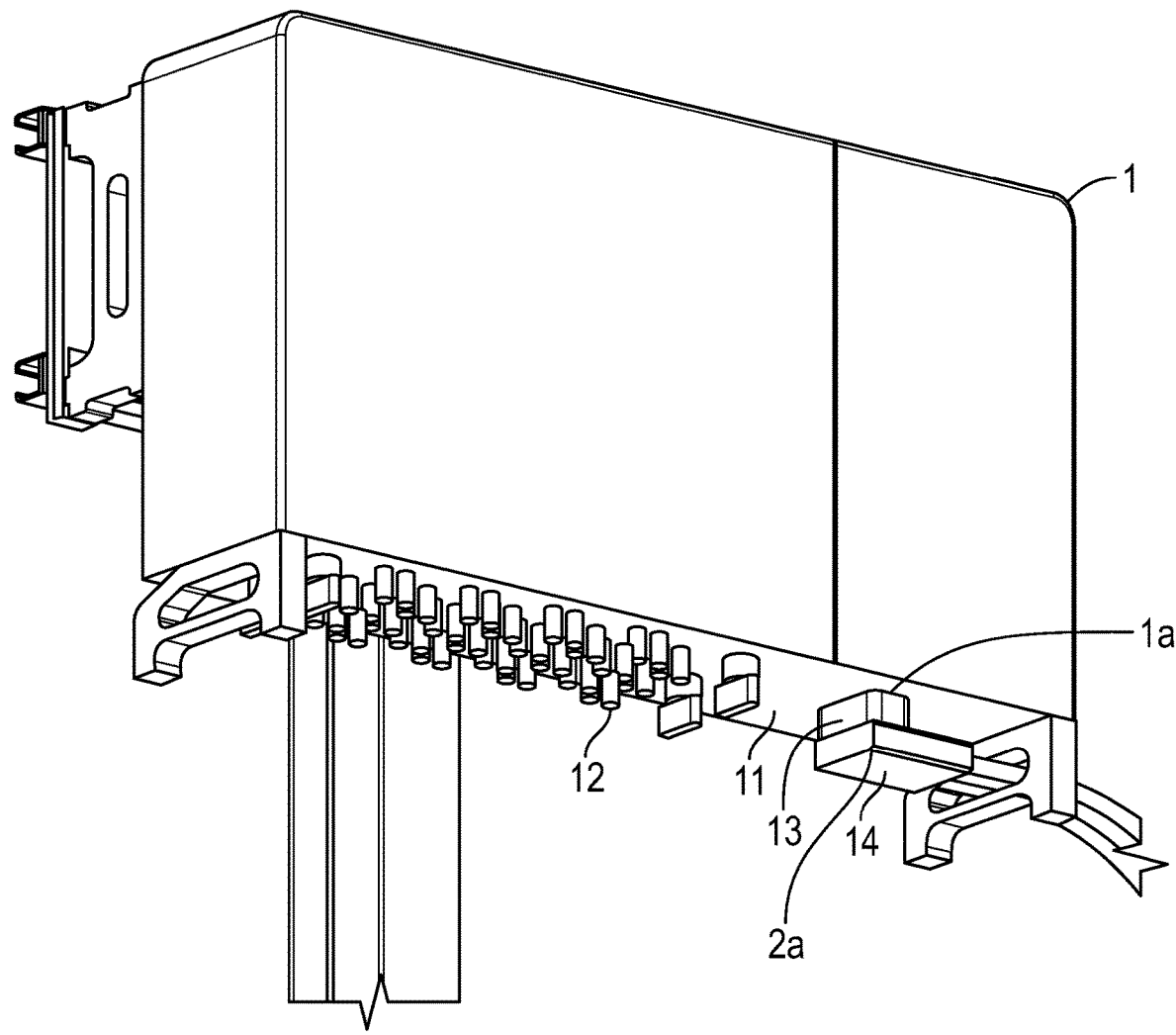
FIG. 5 is an illustration from a perspective view of source equipment according to an embodiment of the present invention.

FIG. 5 illustrates source equipment 1 according to an embodiment of the present invention. Source equipment 1 preferably comprises equipment that either aggregates DC energy from solar PV modules 8, including but not limited to a DC disconnecting combiner, or is an inverter that converts the DC power from solar PV modules 8 into AC power, including but not limited to a 3-phase string inverter. Source equipment used in PV power facilities preferably comprises an inverter of at least about 100 kW, at least about 1,000 kW or at least about 100,000 kW.

Source equipment may also incorporate one or more energy storage elements in addition to, or in replacement of, a DC combiner or inverter elements. In one embodiment, source equipment 1 includes an energy storage system with a capacity of at least about 100 kWh, such as those energy storage systems typically employed for commercial consumers and energy providers for use with utility-scale power sources such as large-scale or localized photovoltaic/solar arrays, wind farms, etc. In another embodiment, source equipment 1 comprises an energy storage system with a capacity of at least about 1 MWh. In another embodiment, source equipment 1 comprises an energy storage system with a capacity of at least about 3 MWh, such as those energy storage systems typically employed for utility-scale energy providers for use with utility-scale power sources such as large-scale or localized photovoltaic/solar arrays, wind farms, etc. In another embodiment, source equipment 1 comprises an energy storage system with a capacity of at least about 10 kWh, such as those energy storage systems typically employed by an individual residence for use with single-residence power source solar systems. In some embodiments, source equipment 1 comprises an electric energy storage system with a capacity of at least about 100 kWh, at least about 1,000 kWh or at least about 100,000 kWh.

Source equipment 1 preferably comprises receptacle 1a that coordinates with plug 2a of cable 2. Traditionally, all input and/or output wires of source equipment are wired in the field to terminate at or within the source equipment without any plugs or other ability to electrically connect its input and/or output cables without having to terminate that input or output. That is, there are no receptacles and plugs in traditional systems and a trained electrician or other technician must actually visit the power generation facility where the source equipment is installed to hard-wire all cables to and from the source equipment as a custom job for each source equipment. The present invention eliminates that need entirely by providing receptacle 1a at the output of source equipment 1, so that cable 2 can simply be plugged in to receptacle 1a to complete the electrical connection. The act of hard-wiring in the field not only requires specialized labor, but also requires the use of hand tools and the addition of lugs onto cables and receptacles. Embodiments of the present invention eliminate the need for specialized labor, the use of hand tools or the addition of lugs while at the power facility.

Depending on whether source equipment 1 is already on location at the power facility or not, source equipment 1 may be provided with receptacle 1a integrated with it or source equipment 1 may be modified in the field to have receptacle 1a. As illustrated in FIG. 5, receptacle 1a may be a feature on plate 11 that is retrofitted to a side or surface of source equipment 1, which plate 11 may also comprise other features, such as solar PV module inputs 12 for receiving the output cables of each individual solar PV module or groups of modules. Preferably, source equipment 1 is assembled to have receptacle 1a before it is installed at or delivered to the power facility.

Receptacle 1a preferably comprises receptacle frame 13 that at least partially encircles terminals connected to power output wires within source equipment 1. Receptacle frame 13 may be of any shape, but preferably its width and length is the same size as or smaller than the width and length of plug 2a. Preferably receptacle 1a and/or receptacle frame 13 is "keyed", that is, its shape is such that it cannot be installed incorrectly when coordinating with plug 2a. For example, in one embodiment, its shape is not symmetrical but has a first side with a first shape (for example, rectangular) and a second side with a second shape (for example, tapered corners of a rectangle or triangular). In this way, there is only one possible orientation that plug 2a can coordinate with receptacle 1a. It may be formed of any material that provides it adequate structure and rigidity, including but not limited to plastic, metal, rubber, etc., and combinations thereof.

Figure 17A:
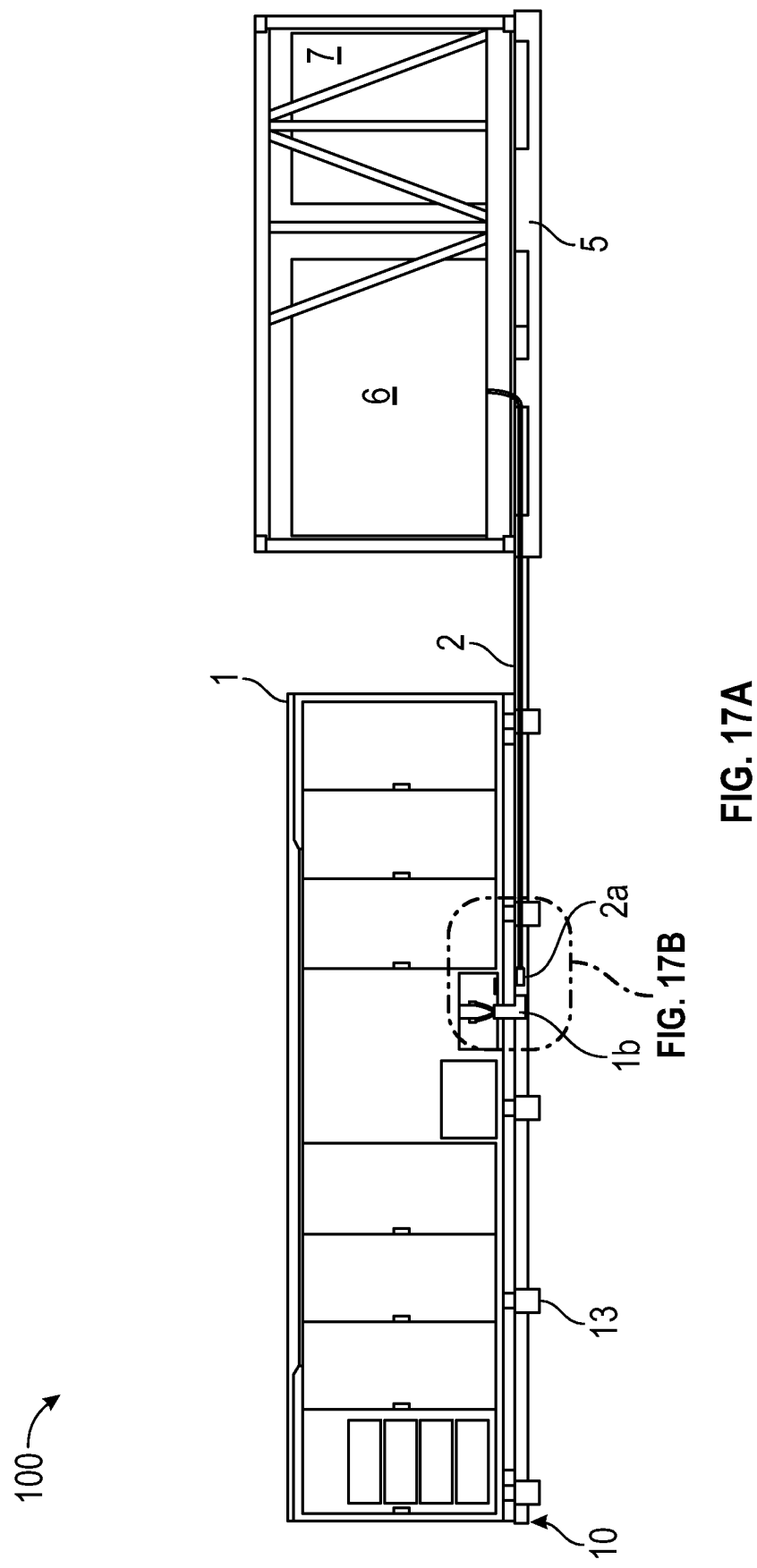
FIGS. 17A and 17B are illustrations of an assembly according to the present invention, FIG. 17A being a side view of source equipment connected to destination equipment through an adaptor located within a ground support unit supporting the source equipment, FIG. 17B illustrating a close-up perspective view of the adaptor, receptacle, cable and plug at the source equipment.
Figure 17B:
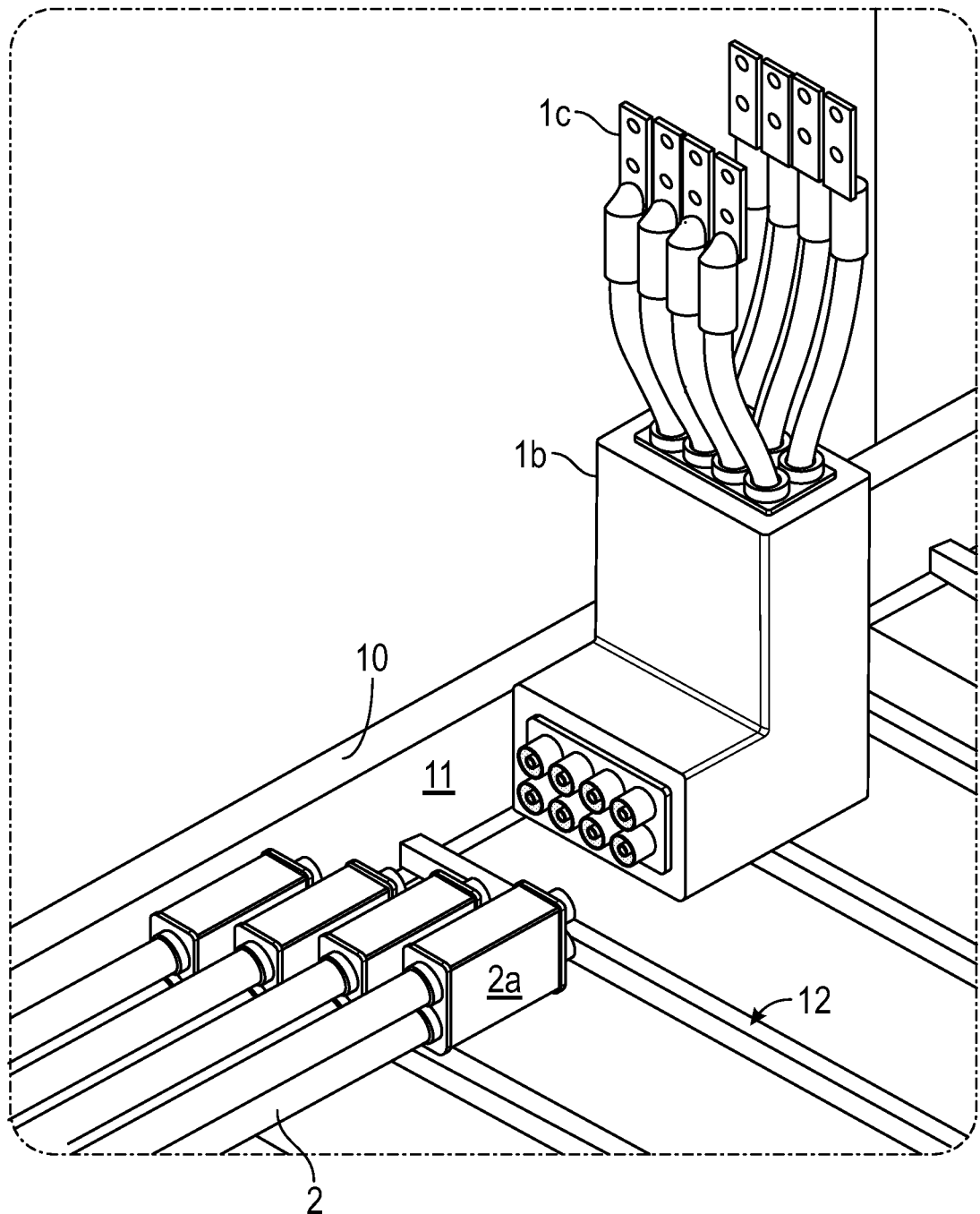
Figure 18A:
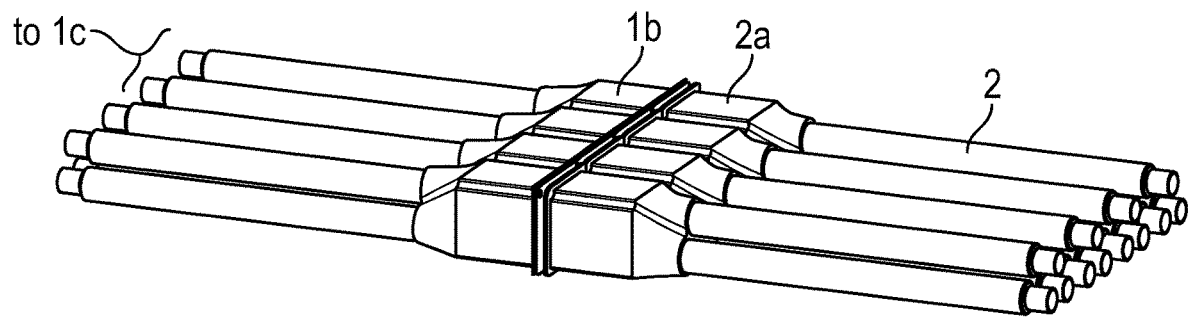
FIGS. 18A, 18B and 18C are illustrations from various views of cables and plugs according to various embodiments of the present invention, FIG. 18A being a perspective view of two cables plugged into each other, FIG. 18B being a perspective view of cables and plugs each of which having three conductors, and FIG. 18C being a cross-sectional or exposed view of the inside of plugs each having three conductors.
Figure 18B:
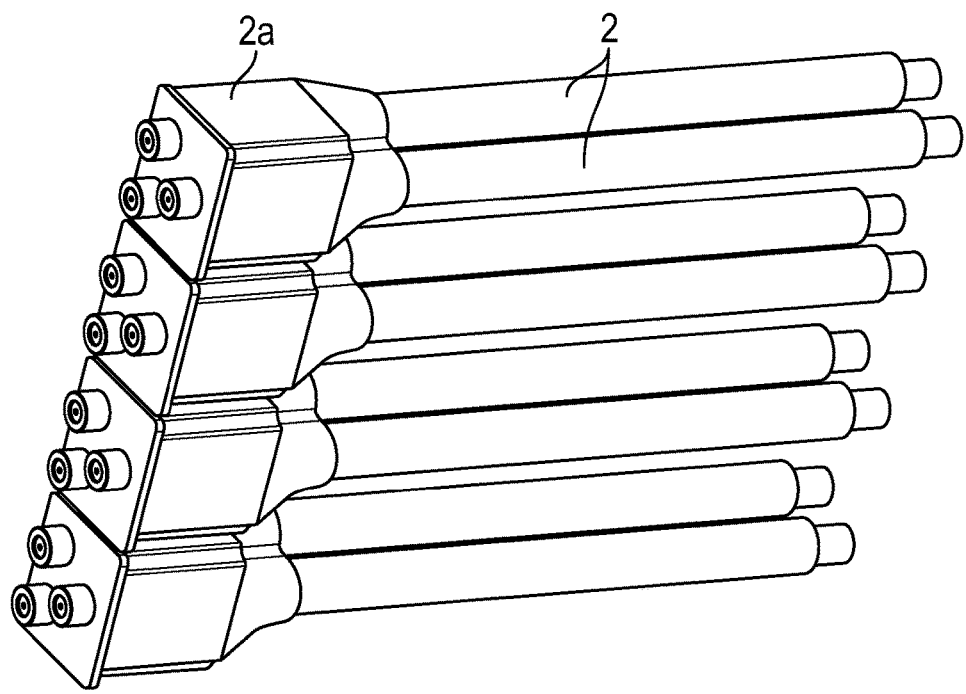
Figure 18C:
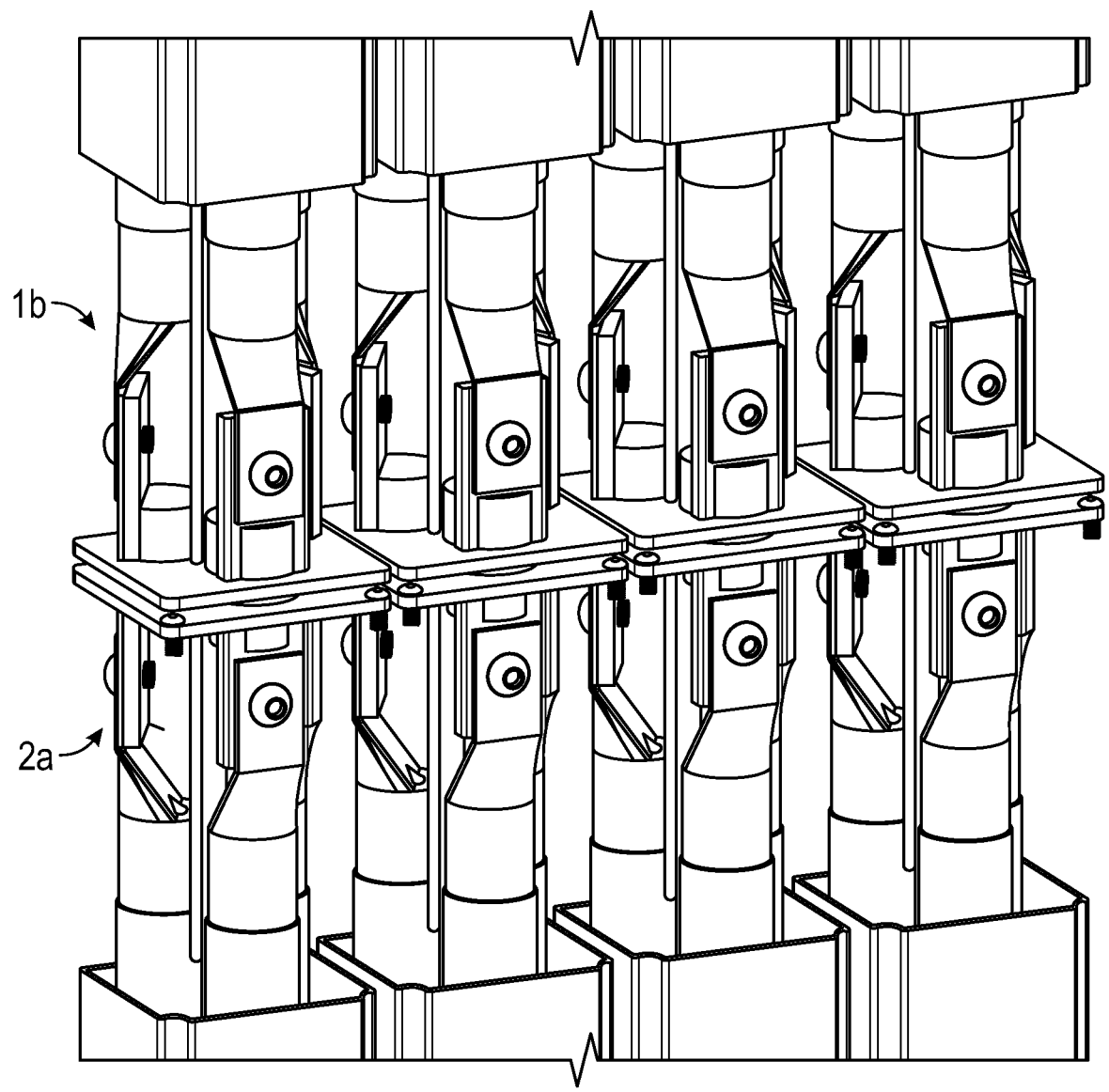
Figure 19:
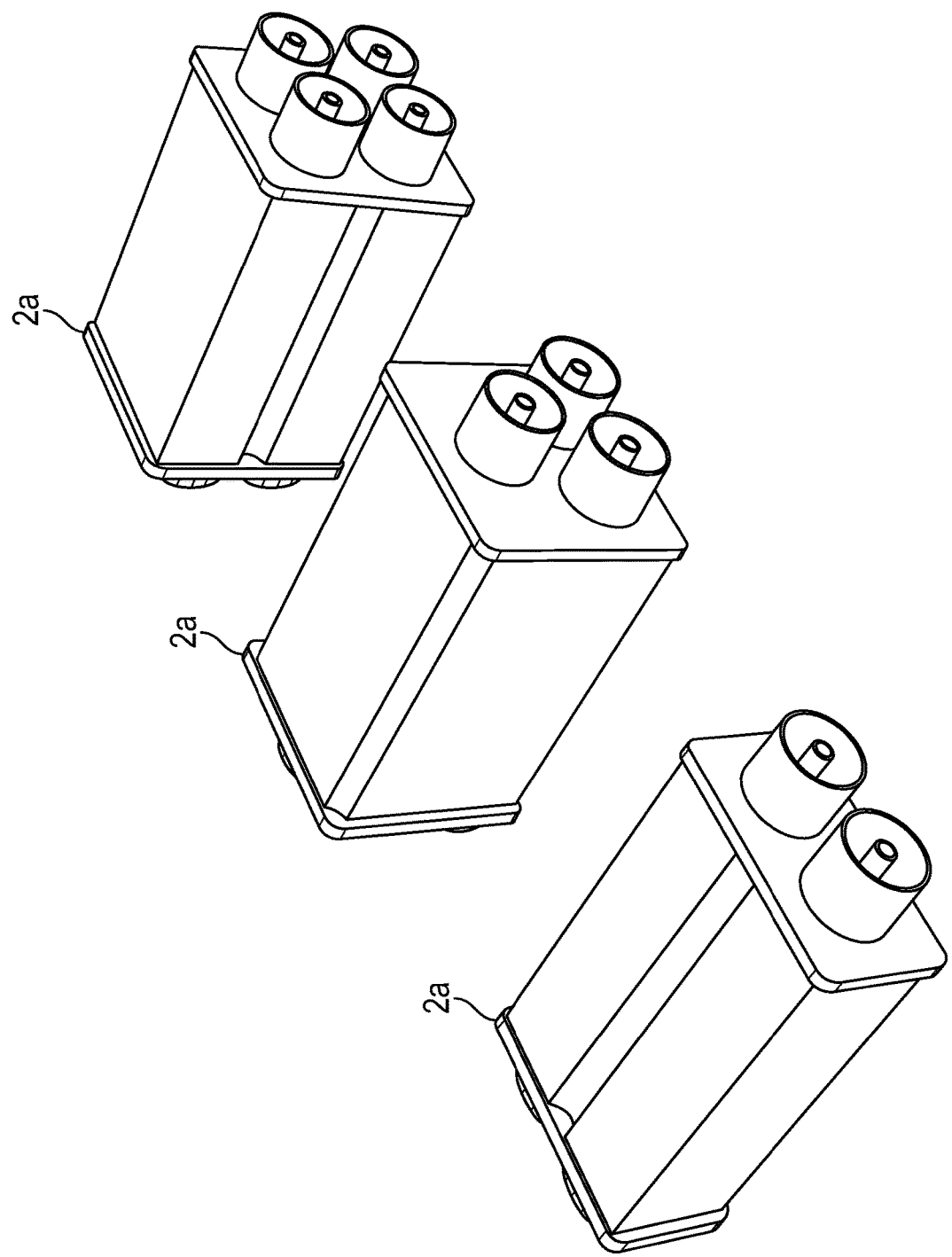
FIG. 19 is an illustration of three different plugs according to embodiments of the present invention, the first on the left comprising two conductors, the second comprising three conductors, and a third comprising four conductors.

Receptacle frame 13 in some embodiments comprises an L-shape, for example as illustrated of adaptor 1b in FIG. 17B. For purposes of this Specification, note that reference to adaptor 1b is also intended to include the features of receptacle 1a unless otherwise stated.

Receptacle 1a may also comprise other features that assist in coordinating with and securing or locking to plug 2a, including but not limited to flanges, holes, slots, projections, tabs and seals. Receptacle 1a preferably comprises a locking mechanism, including but not limited to push and release mechanisms, twist lock mechanisms, screw couplings, ratchet couplings, bayonet couplings, breakaway couplings, push-pull couplings, clamps, and ties.

Figure 12A:
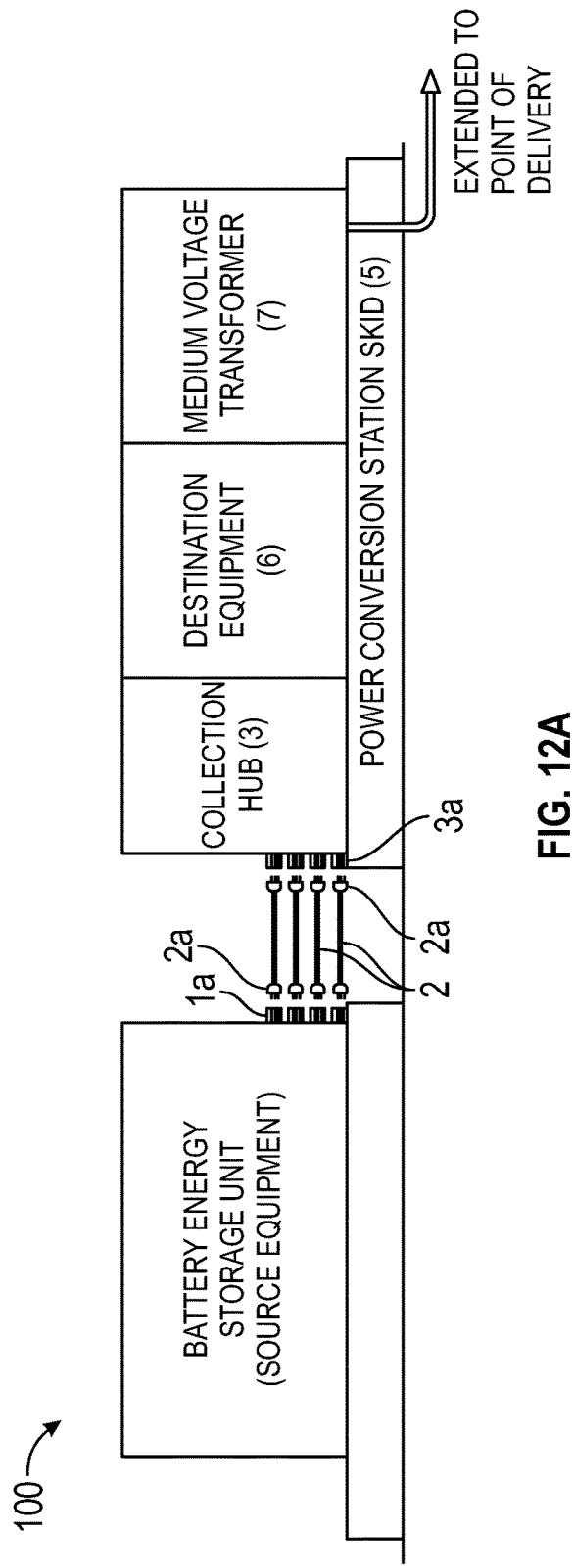
FIGS. 12A and 12B are diagrammatic illustrations of an assembly in which a collection hub is integrated with destination equipment on a power conversion station skid and the source equipment is a battery energy storage unit, according to an embodiment of the present invention, FIG. 12A illustrating a receptacle on the source equipment and FIG. 12B illustrating an adaptor on the source equipment.
Figure 12B:
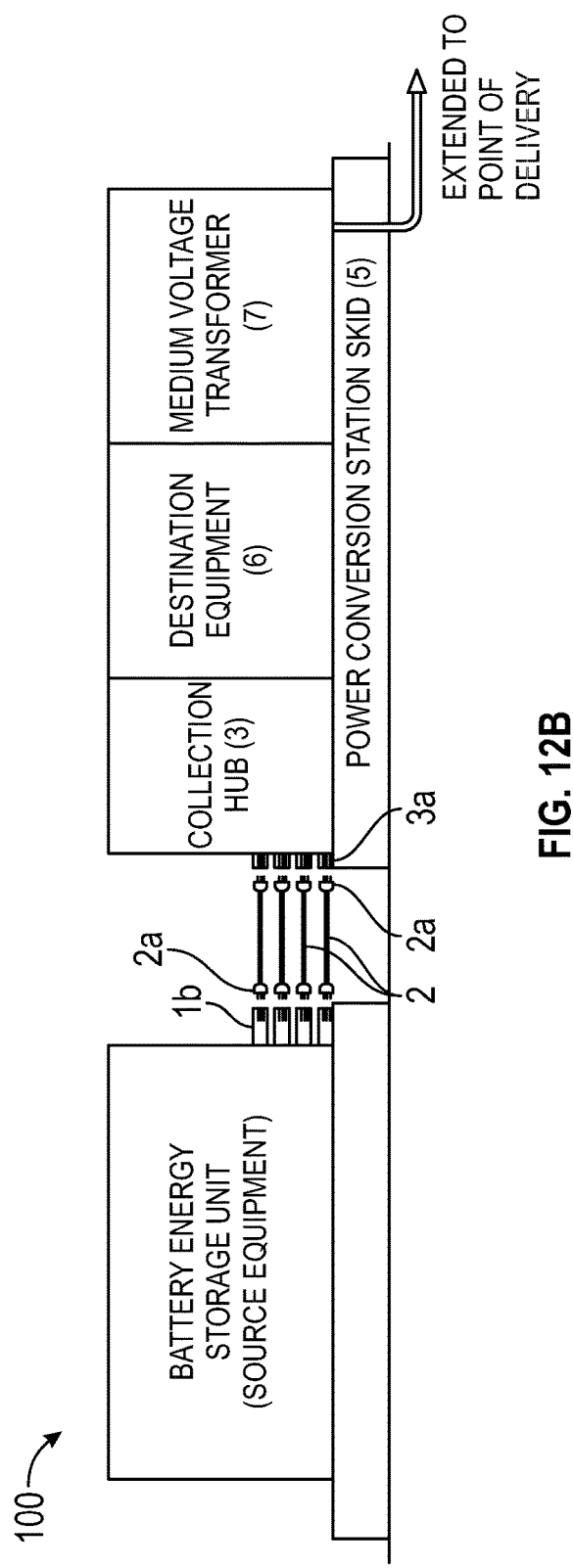
Figure 13A:
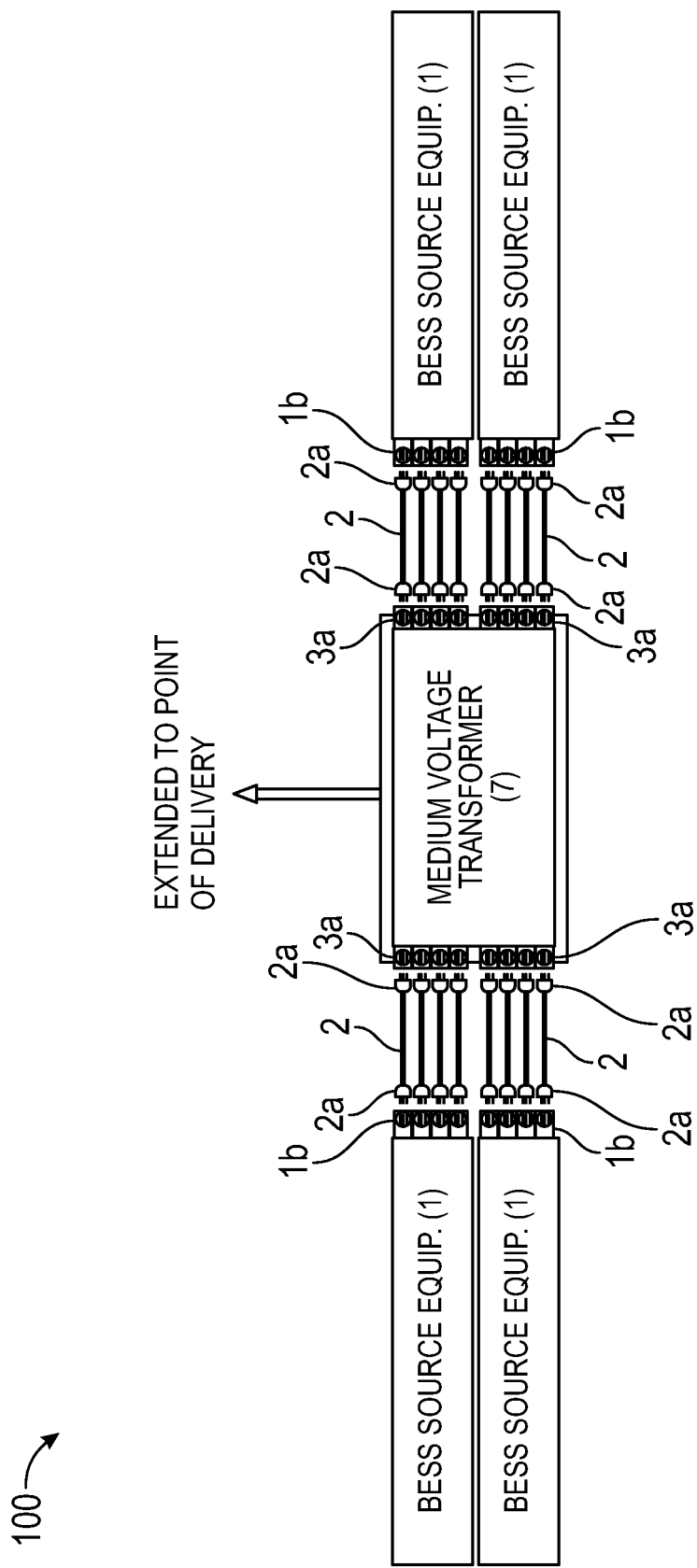
FIGS. 13A and 13B are diagrammatic illustrations of assemblies connecting a plurality of source equipment that are battery energy storage units with destination equipment and/or other electrical equipment on a power conversion station skid, according to an embodiment of the present invention, FIG. 13A illustrating a receptacle on the source equipment and FIG. 13B illustrating an adaptor on the source equipment.
Figure 13B:
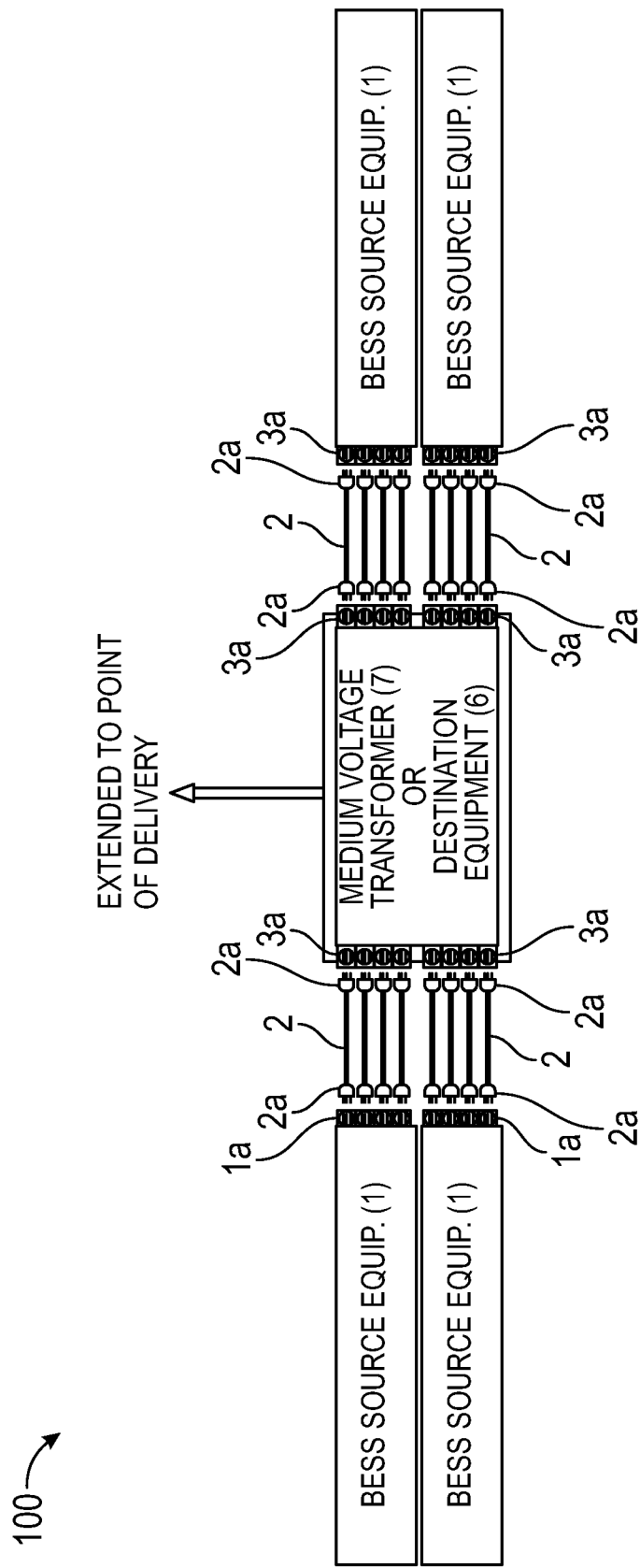
Figure 14A:
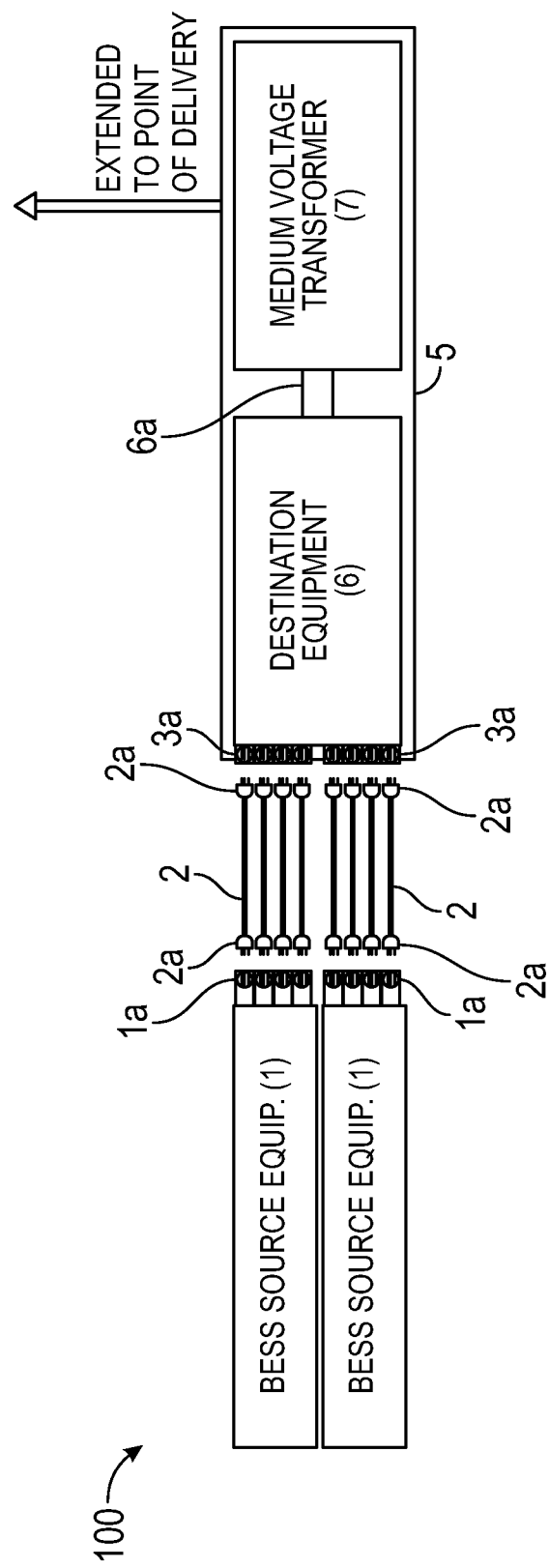
FIGS. 14A and 14B are diagrammatic illustrations of assemblies connecting a plurality of source equipment that are battery energy storage units with destination equipment and/or other electrical equipment on a power conversion station skid, according to an embodiment of the present invention, FIG. 14A illustrating a receptacle on the source equipment and FIG. 14B illustrating an adaptor on the source equipment.
Figure 14B:
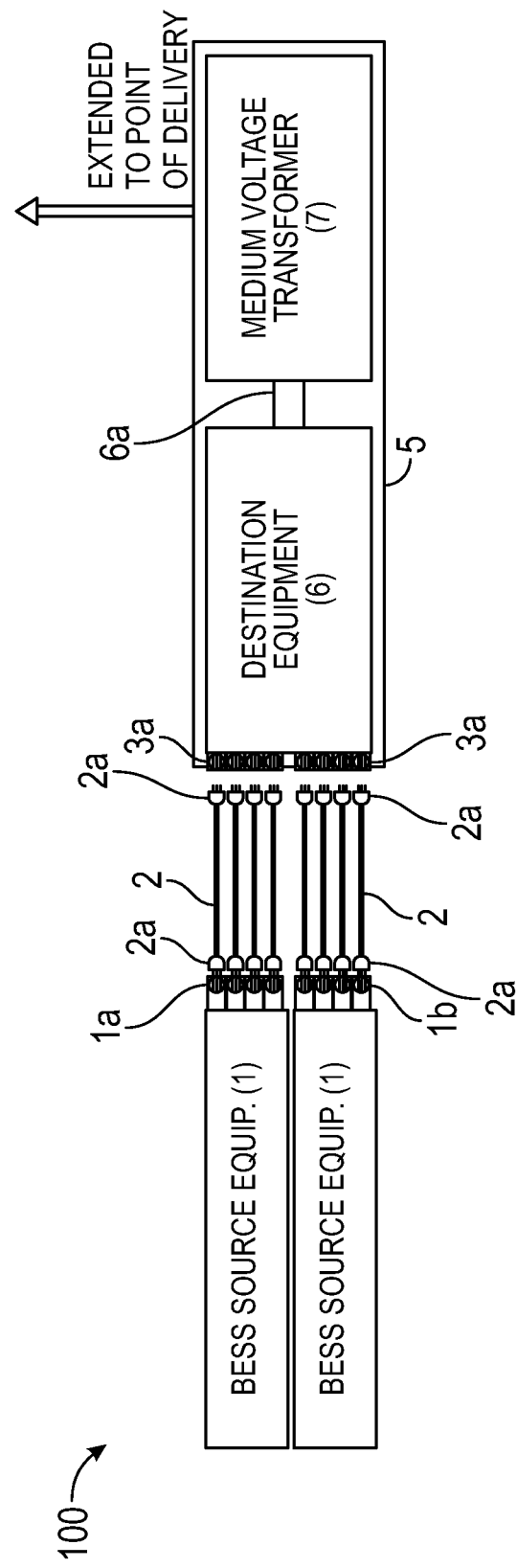

FIGS. 11A, 11B, 12A, 12B, 13A, 13B, 14A, and 14B illustrate various configurations of system 100 employing source equipment 1 comprising battery energy storage units and in which cable 2 comprises plug 2a on each of its ends, electrically connecting source equipment 1 (or a plurality thereof) with either collection hub 3 and/or destination equipment 6. FIG. 11A illustrates system 100 with conversion and in which receptacles 1a are integrated. FIG. 11B illustrates system 100 with conversion and adaptor 1b. FIG. 12A illustrates system 100 without conversion and with integrated receptacles 1a. FIG. 12B illustrates system 100 without conversion and with adaptor 1b. FIG. 13A illustrates system 100 as used with four source equipment 1, with conversion and with adaptors 1b. FIG. 13B illustrates system 100 as used with four source equipment 1, with conversion and in which receptacles 1a are integrated. FIG. 14A illustrates system 100 as used with two source equipment 1 without conversion and with integrated receptacles 1a. FIG. 14B illustrates system 100 as used with two source equipment 1 without conversion and with receptacle adaptor 1b.

Figure 15:
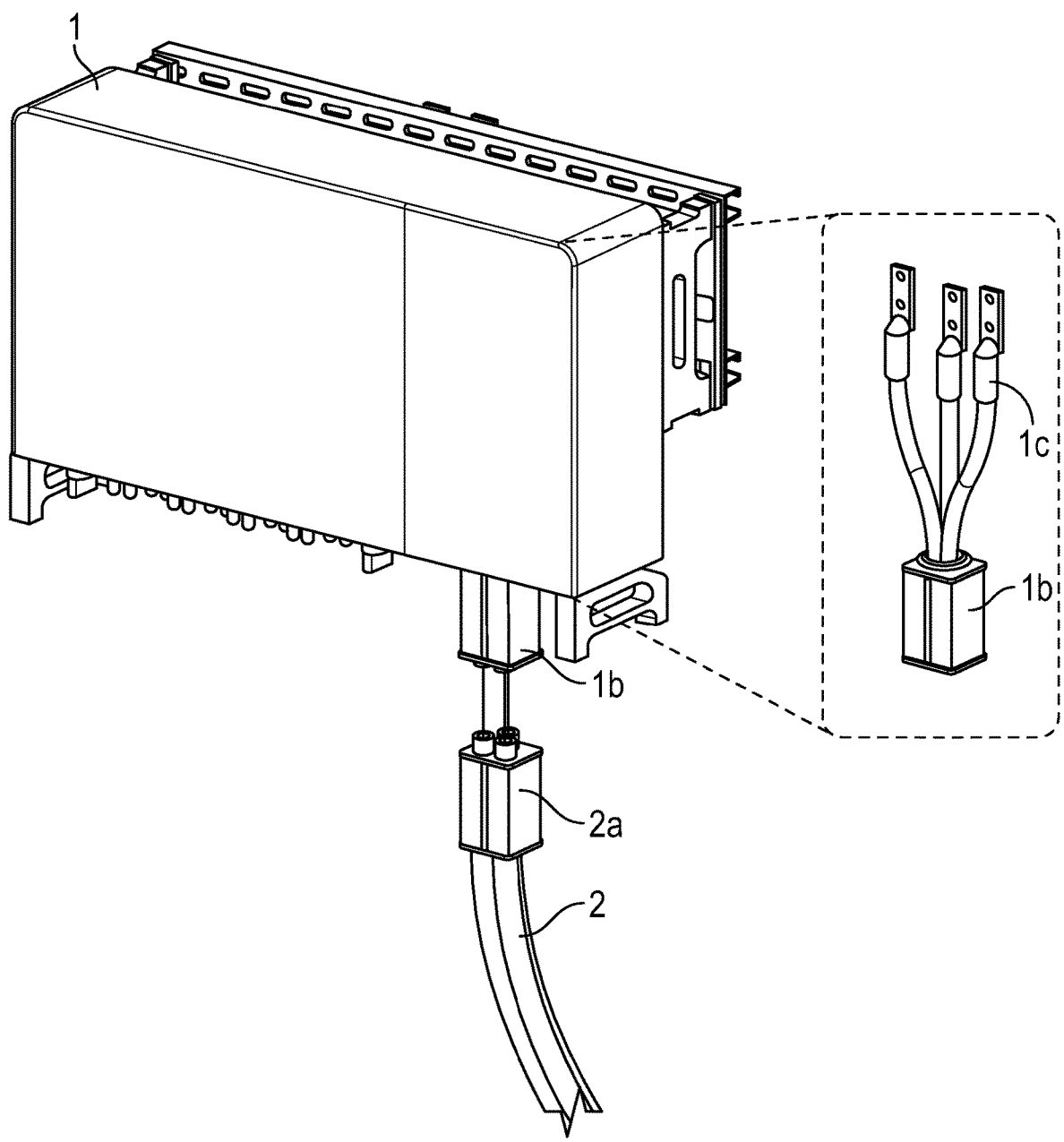
FIG. 15 is an illustration from a perspective view of source equipment according to an embodiment of the present invention along with a view of the inside of a portion of the source equipment.

FIG. 15 illustrates source equipment 1 comprising receptacle adaptor 1b. Receptacle adaptor 1b comprises the same features of receptacle 1a except that its cables terminate in conductors 1c electrically terminated/connected with source equipment 1. Preferably adaptor 1b is installed within source equipment 1 prior to delivery or installation of source equipment 1 at the power facility.

Cable 2 Between Source Equipment 1 and Collection Hub 3

Figure 2:
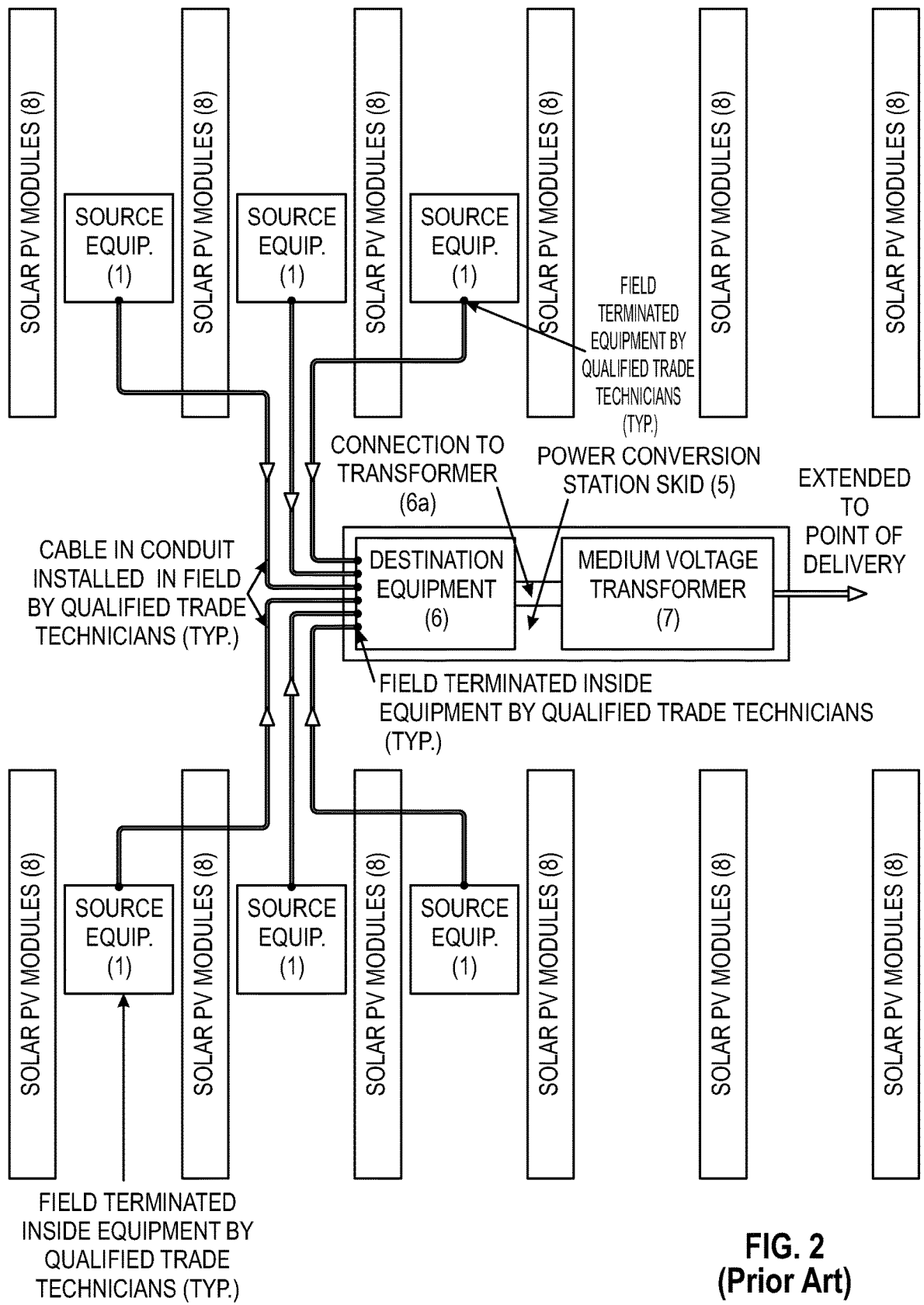
FIG. 2 is a diagrammatic illustration in plan view of a completed installation of an assembly according to the traditional methods of designing and installing a PV plant, showing the various equipment all connected and installed with the various conduits that need to be installed in the field, generally in trenches, with many conductors pulled through them and intricate electrical termination of the cables that requires certified electricians to accomplish.

Referring to FIG. 5, cable 2 electrically connects source equipment 1 to collection hub 3 or in some embodiments to destination equipment 6 without a collection hub 3. Traditionally, any cable between source equipment 1 and other equipment would have its first end hard-wired into source equipment 1 and its second end hard-wired into destination equipment 6, as illustrated in FIGS. 1 and 2. The term "hard-wiring" or "hard-wired" as used herein means any electrical wiring that does not include a plug or other temporarily securable electrical connection to make the electrical connection. Such hard-wiring must be conducted on site at the power generation facility by specialized labor, for example, licensed electricians. With the present invention, cable 2 comprises plugs 2a on each of its ends. In this way, cable 2 may be fabricated prior to installation and delivered to the power generation facility to simply be plugged in to source equipment 1 and collection hub 3, which does not require specialized labor.

Preferably, cable 2 is insulated with an insulating material wrapped entirely around the cables, including but not limited to thermoplastics, polyvinyl chloride (PVC), polyethylene (PE), polyurethane (PUR), chlorinated polyethylene (CPE), nylon, thermosets, rubber, neoprene, silicone, fiberglass, etc., and combinations thereof. Cable 2 may comprise any number of wires or cables within it, for example, three wires as shown in the illustrations, in this instance each being a single phase of a three phase AC circuit. It could also be multiple parallel runs of DC conductors from the source equipment 1 to the collection hub 3.

Figure 6:
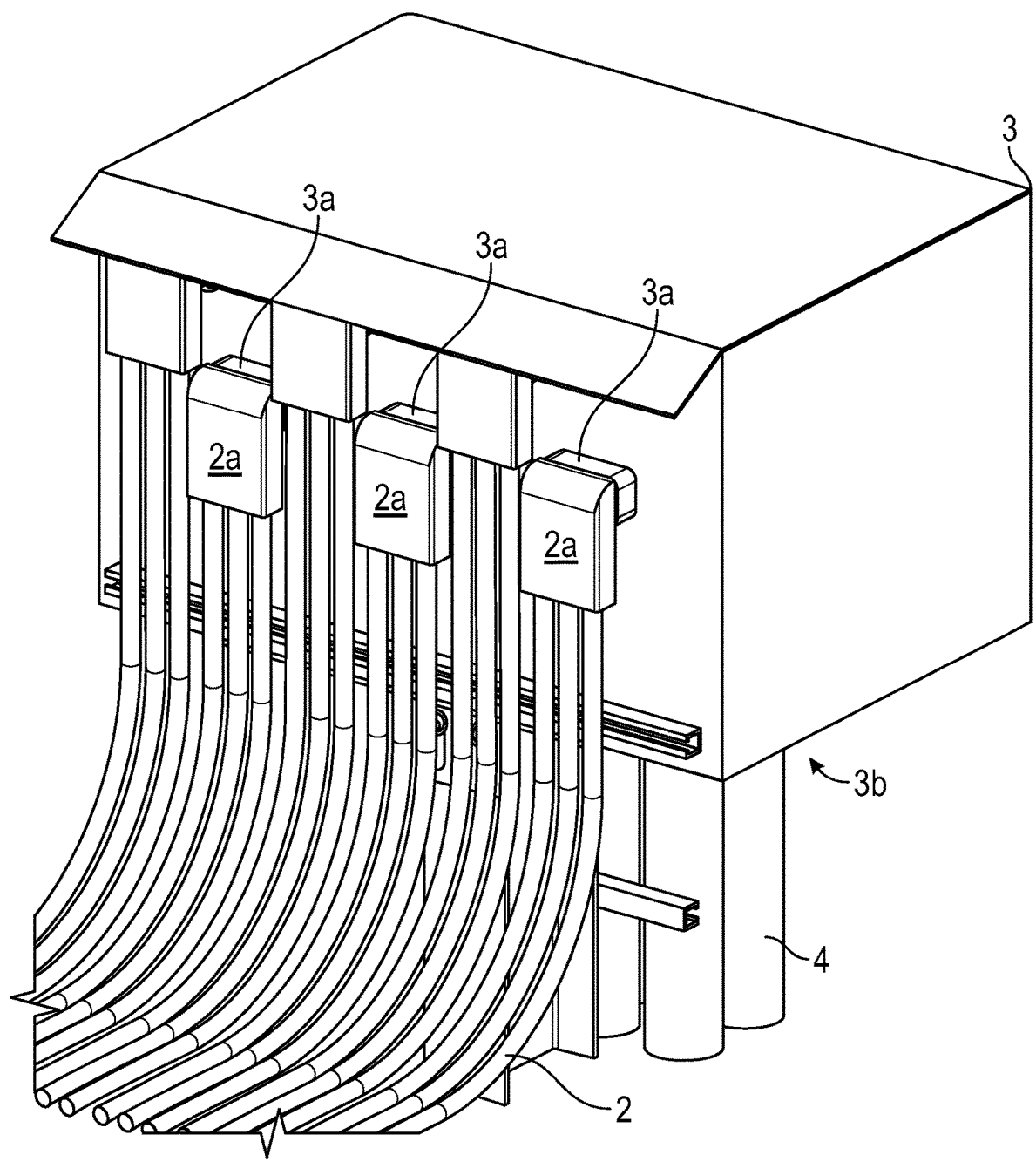
FIG. 6 is an illustration from a perspective view of a collection hub according to an embodiment of the present invention.

Referring to FIGS. 5 and 6, plug 2a comprises plug frame 14 which at least partially surrounds terminals of cable 2. Plug frame 14 may be of any shape that coordinates with the shape of receptacle 1a, but preferably its width and length is the same size as or larger than the width and length of receptacle 1a. Preferably plug 2a and/or plug frame 14 is "keyed", that is, its shape is such that it cannot be installed incorrectly when coordinating with receptacle 1a, as described above in regard to the shape and size of receptacle 1a. For example, in one embodiment, its shape is not symmetrical but has a first side with a first shape (for example, rectangular) and a second side with a second shape (for example, tapered corners of a rectangle or triangular). In this way, there is only one possible orientation that plug 2a can coordinate with receptacle 1a. It may be formed of any material that provides it adequate structure and rigidity, including but not limited to plastic, metal, rubber, etc., and combinations thereof.

Plug 2a may also comprise other features that assist in coordinating with and securing to receptacle 1a, including but not limited to flanges, holes, projections, and seals. Plug 2a preferably comprises a locking mechanism, including but not limited to push and release mechanisms, twist lock mechanisms, screw couplings, ratchet couplings, bayonet couplings, breakaway couplings, push-pull couplings, clamps, and ties.

The length of cable 2 will depend on the particular application. In some embodiments, certain standard lengths will be fabricated prior to being delivered to the power facility so that the step of customizing the length of such cables can be eliminated. Preferably the length of cable 2 is greater than the length of cable 4. Likely, destination equipment 6 is a shorter distance away from collection hub 3 than source equipment 1 is away from collection hub 3.

In the traditional systems illustrated in FIGS. 1 and 2, each source equipment 1 would be hard-wired with cables extending directly all the way to destination equipment 6. In many circumstances, especially for solar power generation facilities with numerous rows of PV modules 8, many if not all of the cables between source equipment and destination equipment would need to then be buried to travel below roads or other obstacles that may be encountered over such distances. One of the objectives of the present invention is to eliminate all hard-wiring in the field and to terminate cable 2 before it would need to be disposed within a trench, such that cable 2 can remain above ground and plug, rather than be hard-wired, into collection hub 3 which would then aggregate a plurality of such cables 2. In many applications, particularly for solar power generation facilities, cable 2 extends a relatively short distance between source equipment 1 and collection hub 3 and/or is not crossing roads or other obstacles that could possible damage it, such that it is most efficient for the cable to be above ground extending along the structures of solar PV modules 8 and/or on the ground near them.

Collection Hub 3

FIG. 6 illustrates an embodiment of collection hub 3. Collection hub 3 helps achieve the present invention's "plug and play" objective by efficiently and aggregating the outputs of a plurality of source equipment 1.

Referring to FIG. 6, collection hub 3 comprises one or more receptacles 3a, each of which receives a plug 2a of a cable 2 coming from the output of one of more different source equipment 1. Preferably, all such receptacles 3a are on the same single side of collection hub 3, so that all cables 2 can coordinate with collection hub 3 in an organized manner. To aid in organization of cables 2, preferably receptacles 3a are disposed on collection hub 3 such that their heights relative to the top of collection hub 3 are alternating. As shown in FIG. 6, the top of a first receptacle 3a is at a first height above the top of a second receptacle 3a adjacent to the first receptacle 3a. Receptacle 3a preferably has the same or similar features as receptacle 1a described above.

Collection hub 3 comprises at least one output 3b. Preferably, output 3b outputs the power combined from all or some number of the various source equipment 1 that collection hub 3 receives. However, in some embodiments, there are just as many outputs 3b as there are receptacles 3a, for example, as shown in FIG. 6. Preferably all outputs 3b are bundled together, that is, they are disposed in physical but not electrical contact with each other along a majority of their length until their termination at their other end. In this way, if they need to be buried underground in the example of a road crossing, all of them can extend together in a single trench.

Collection hub 3 serves the function of allowing for the rapid deployment of a solar PV plant and reducing the quantity of wiring terminations needed to be performed and tested in the field when constructing the PV plant. It also allows for a secure and protected means to connect source equipment 1 to destination equipment 6 in a pre-fabricated manner (that is, the hard-wiring is completed prior to delivery to the power facility), while also passing beneath other obstacles, such as roadways or other utility infrastructure that may be present at the PV plant site. In typical solar power generation facilities, destination equipment 6 is commonly located near a road where it can be accessed for maintenance. Cables should not travel over roads. One of the objectives of the present invention is to reduce the amount of field labor involved in burying and terminating cables. In the present invention, collection hub 3 aggregates a plurality of cables 2 that are preferably above ground and outputs that power to a single cable 4 or plurality of cables 4 that are preferably below ground and typically extending a distance to destination equipment 6 and transformers 7 integrated into a power conversion station skid 5. The purpose of collection hub 3 is to serve as a means for rapid deployment of an electrically conductive pathway connection from source equipment 1 to destination equipment 6 in an entirely manufactured means and method, while facilitating rapid deployment and embedment of the cabling/conductors between the collection hub 3 and destination equipment 6 in an underground trench beneath any roadways or other obstructions.

For example, source equipment 1 may be electrically connected to destination equipment 6 when cable 2 and locking plugs 2a are connected into both receptacles 1a of their respective source equipment 1 and the corresponding receptable 3a in collection hub 3. That corresponding receptable 3a of collection hub 3 is in turn already connected to and wired into the destination equipment 6 via a continuous electrical pathway from collection hub 3 via cables 4 to destination equipment 6.

Preferably, collection hub 3 will be connected to, integrated as an appendage of, or otherwise disposed with power conversion station skid 5 at least for purposes of assembly and shipping, and cables 4 and collection hub 3 will unfurl as a separate object from power conversion station skid 5 so that cable 4 can be placed into a short roadway-crossing trench and buried and so that collection hub 3 can be placed closer to solar PV modules 8 than power conversion station skid can be placed. In this way, collection hub 3 is separable from or otherwise independent of power conversion station skid 5 but still electrically connected to it. Collection hub 3 may be affixed to other equipment or mounted on a foundation and will be ready to accept one or more of locking plugs 2a from one or more cables 2 to then be electrically connected to source equipment 1 without any field hard-wiring terminations necessary.

Figure 9:
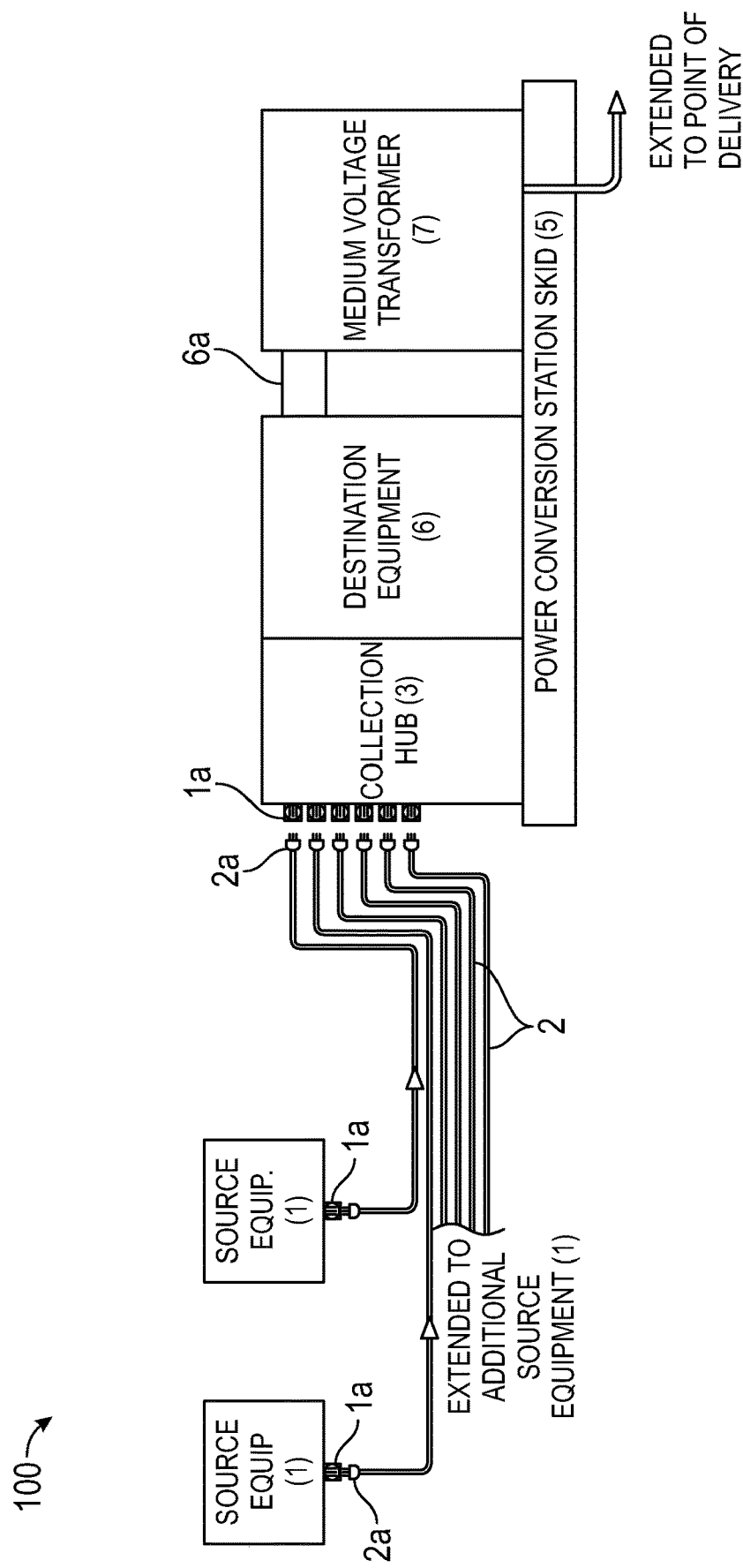
FIG. 9 is a diagrammatic illustration of an assembly in which a collection hub is integrated with destination equipment on a power conversion station skid, according to an embodiment of the present invention.
Figure 10:
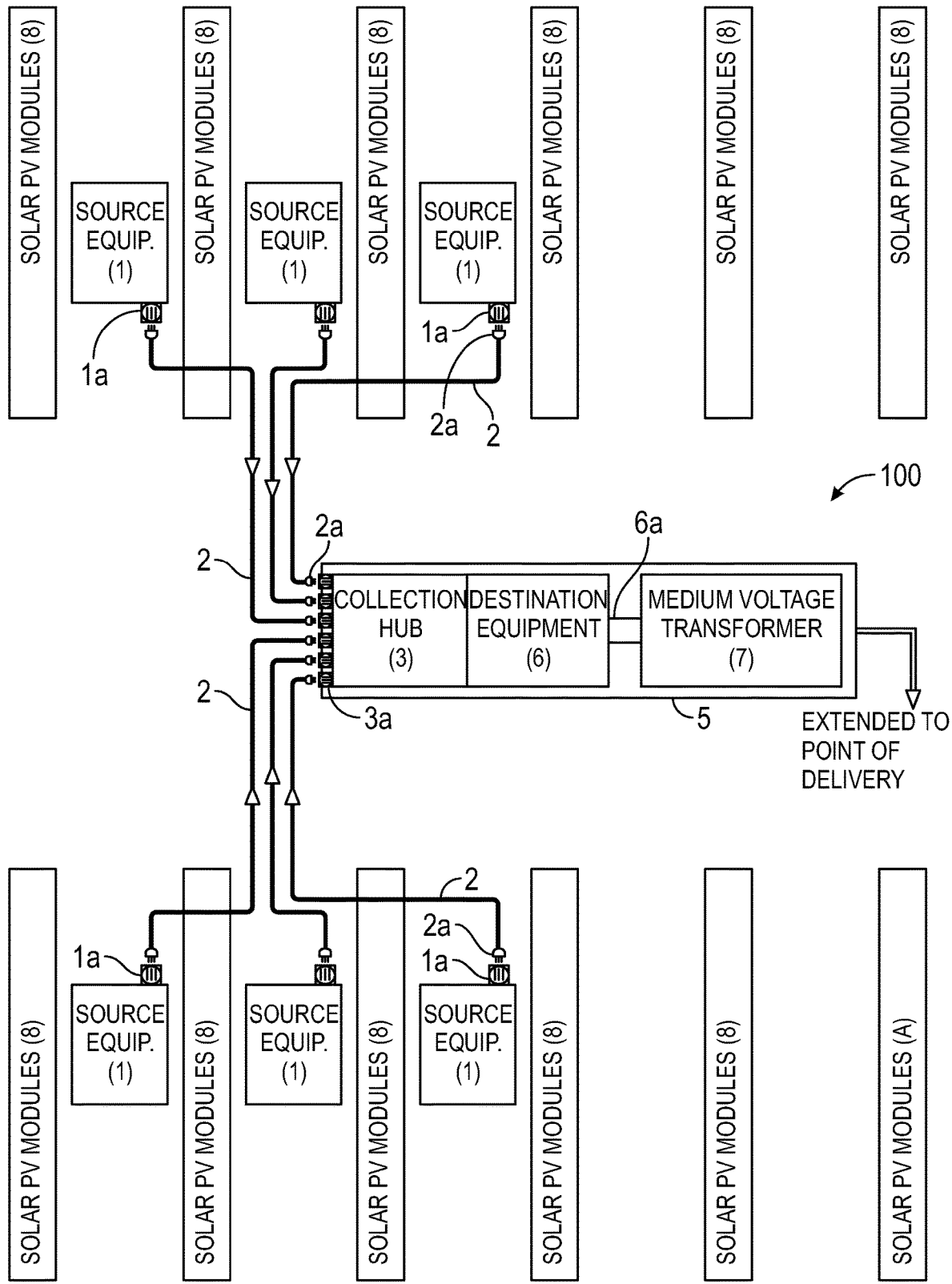
FIG. 10 is a diagrammatic illustration of a plan view of an assembly in a PV power facility in which a collection hub is integrated with destination equipment on a power conversion station skid, according to an embodiment of the present invention.

In another embodiment, collection hub 3 is physically integrated with or otherwise physically attached to destination equipment 6 and power conversion station skid 5. In such embodiments, there may or may not be a cable connecting the output of collection hub 3 to destination equipment. Referring to FIGS. 8-10, and 16, collection hub 3 is integrated with or into destination equipment 6 and disposed on power conversion station skid 5. In this embodiment of the design, the integration of collection hub 3 into destination equipment 6 reduces the complexity and distance of the cable 4 that connects collection hub 3 electrically to destination equipment 6. This embodiment of the design would preferably be used where all of the rows of solar PV modules 8, source equipment 1, and cables 2 were located adjacent to the collection hub 3 and destination equipment 6. For example, if all of the rows of PV modules 8 and their source equipment 1 were on the same side of a road as destination equipment 6 that they feed, cable 4 that connects collection hub 3 to destination equipment 6 is not needed. Rather, as illustrated in FIG. 9, all of collection hub 3 and destination equipment 6 would be disposed on the same power conversion station skid 5 and receive cables 2 from the various source equipment 1 directly into collection hub 3 and destination equipment 6 through the same receptacles 3a.

In some embodiments, system 100 comprises a combination of collection hubs 3 integrated into destination equipment 6. In other embodiments, collection hubs 3 are not integrated into the destination equipment 6. In some embodiments, system 100 comprises a combination of collection hubs 3 that are integrated with destination equipment 6 and some that are not. Such depends on the configuration of solar PV module rows 8 and the general layout of the solar PV plant and any access roads, or lack thereof. One or more collection hubs 3 could be directly integrated into destination equipment 6, while at the same time zero or more collection hubs 3 could be connected to destination equipment 6 via cable 4 some distance away from the destination equipment.

Cable 4 Between the Collection Hub and Destination Equipment

Referring to FIG. 6, electrically connected to each output 3b is cable 4. Cable 4 may or may not comprise a plug comprising the features of plug 2a. Cable 4 may comprise such a plug on one of its ends, on both of its ends, or on none of its ends. In embodiments in which cable 4 does not have a plug on either end, preferably cable 4 is hard-wired to destination equipment 6 and collection hub 3 prior to delivery to or installation at the power facility.

Cable 4 preferably comprises a conduit surrounding it because it is likely that cable 4 will need to extend underground to avoid obstacles such as roads. Cable 4 may comprise any number of wires or cables within it. Cable 4 and/or its conduit is preferably insulated with an insulating material wrapped entirely around the cables, including but not limited to thermoplastics, polyvinyl chloride (PVC), polyethylene (PE), polyurethane (PUR), chlorinated polyethylene (CPE), nylon, thermosets, rubber, neoprene, silicone, fiberglass, etc., and combinations thereof.

The length of cable 4 will depend on the particular application. Preferably certain standard lengths will be prefabricated so that the step of customizing the length of such cables can be eliminated. Preferably, the length of cable 4 will be between about ten feet (or about three meters) and about five hundred feet (or about 150 meters), more preferably between about ten feet (or about three meters) and about two hundred feet (or about 60 meters), and most preferably between about ten feet (or about three meters) and fifty feet (or about fifteen meters).

Preferably, cable 4 is fabricated prior to delivery or installation at the power facility, and delivered to the power facility in a spool or is otherwise in a coiled state along with power conversion station skid 5 assembled prior to delivery to the power generation facility, as discussed in further detail herein.

Figure 7:
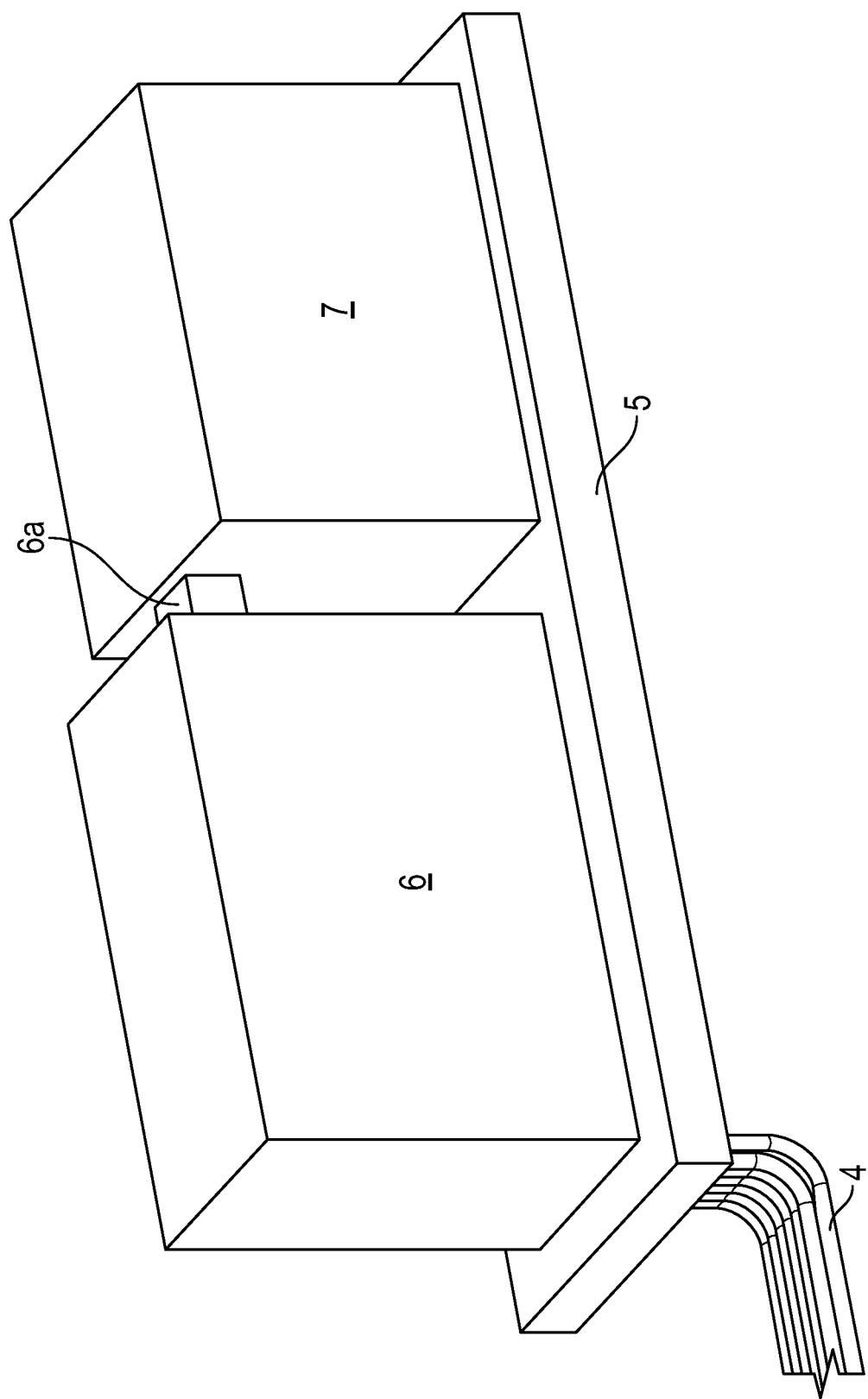
FIG. 7 is an illustration from a perspective view of a power conversion station skid with destination equipment and its various connections, according to an embodiment of the present invention.
Figure 8:
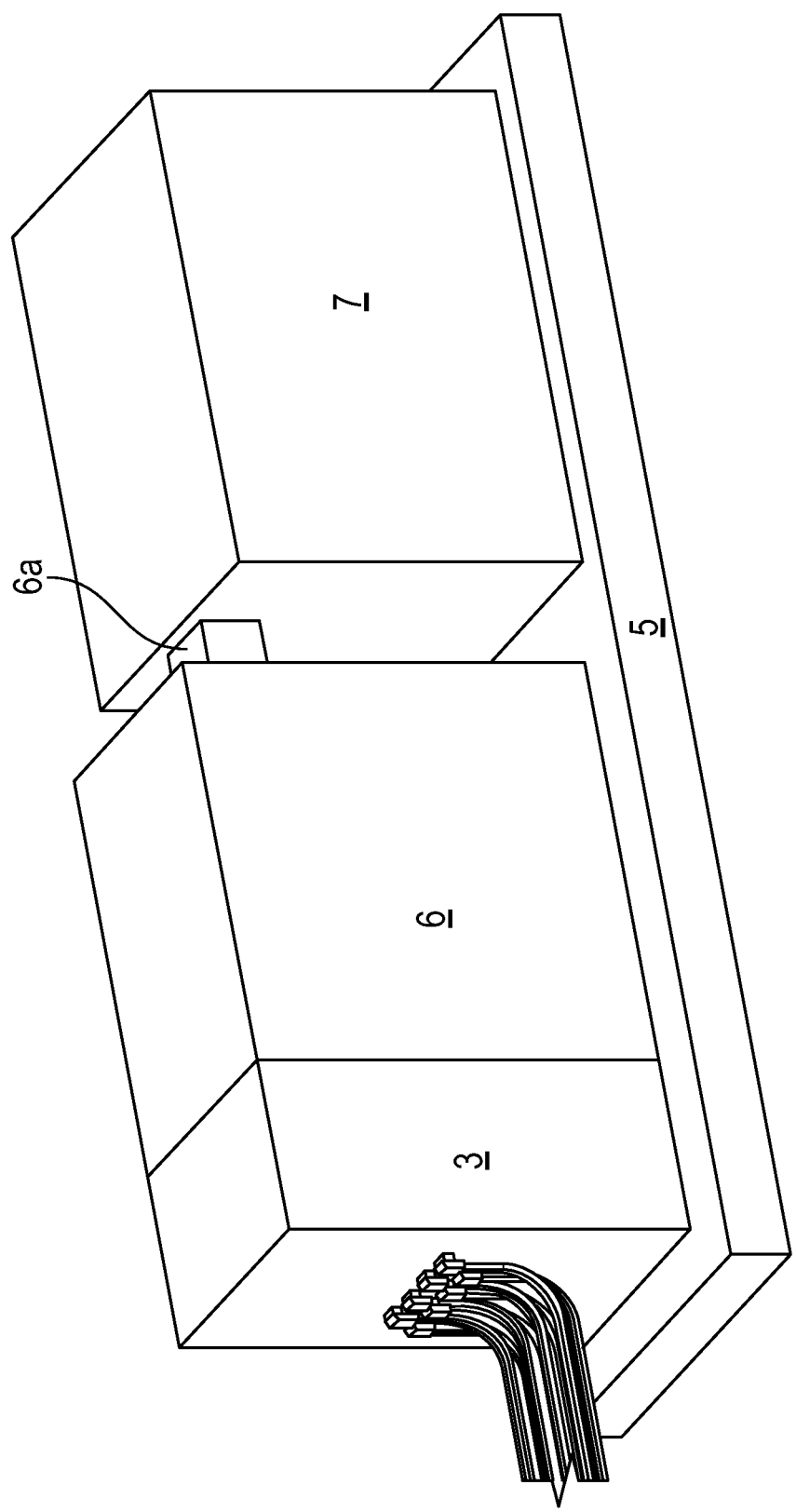
FIG. 8 is an illustration from a perspective view of a collection hub integrated with destination equipment and disposed on a power conversion station skid, according to an embodiment of the present invention.

Referring to FIG. 7, cables 4 enter into destination equipment 6 through power conversion station skid 5. That is, power conversion station skid 5 comprises holes, cavities or channels within it, preferably extending from its bottom surface through its top surface, to permit cables 4 to pass through it and into destination equipment 6. In another embodiment, power conversion station skid 5 is itself electrically connected to or electrically integral with destination equipment 6 and power conversion station skid 5 comprises plugs or receptacles to which cables 4 can electrically connect to destination equipment 6 via the electrical plugs in power conversion station skid 5.

Cable 4 is preferably provided on a spool with power conversion station skid 5 so that it can be unrolled once delivered to the power generation facility. In this way, power conversion station skid 5, as integral with destination equipment 6 and transformer 7, can be provided and delivered together with collection hub 3 and cable 4 already electrically connected with destination equipment 6, so all that needs to be performed to install system 100 is to place power conversion station skid 5 at the desired location and to roll out cable 4 and collection hub 3 from it, as described more thoroughly herein with the regard to the methods of installation.

Destination Equipment 6 and Power Conversion Station Skid 5

Referring to FIG. 7, destination equipment 6 is the equipment that prepares the power received from collection hubs 3 for output to the point of delivery, including but not limited to medium voltage transformer 7 or any other necessary electrical transformers, centralized inverters, switchgear, metering equipment, etc., as the particular application may require. Preferably, destination equipment 6, and any other equipment necessary that is part of the circuit between collection hub 3 and the point of delivery, is all disposed on power conversion station skid 5. In this way, power conversion station skid 5 is an integral unit that can be fabricated prior to delivery to or installation at the power facility and simply be delivered to the power facility to be connected into the power facility's other equipment, as described herein.

Power conversion station skid 5 preferably comprises a rigid frame adequate to support the weight of all the equipment intended to be integral with or disposed on it, including the weight of destination equipment 6, transformer 7 and connections 6a. Power conversion station skid 5 is preferably formed of metal, including but not limited to steel, iron, and any combination thereof, and may also comprise concrete or other filler materials including but not limited to plastics, rebar, etc. Power conversion station skid 5 is preferably shaped and sized to have at least the dimensions of the bottom surfaces of destination equipment 6 and transformer 7, but also have dimensions smaller than the dimensions of transportation vehicles that are legally able to drive on public roads. Preferably, power conversion station skid 5 is rectangular in shape but in some embodiments may have other shapes including but not limited to curved sides/edges, or be oval-shaped.

Ground Support Unit 10

Figure 16:
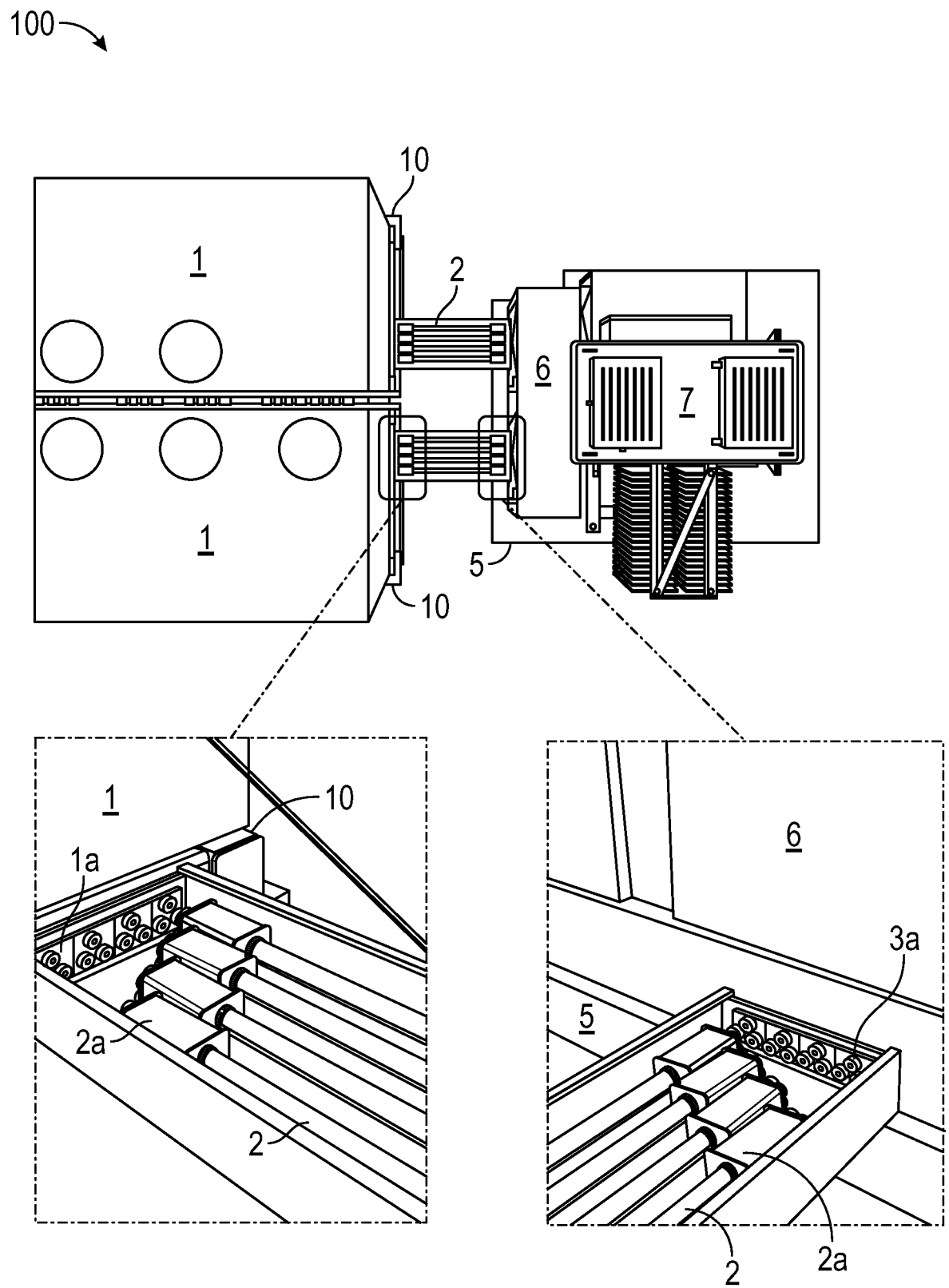
FIG. 16 is an illustration of several view of an assembly according to the present invention, the view provided at the top of the sheet being a plan view from the top, the view provided at the bottom left of the sheet being a close-up perspective view of the receptacles, plugs and cables at the source equipment, and the view provided at the bottom right of the sheet being a perspective view of the receptacles, plugs and cables at a collection hub integrated with destination equipment.

Perhaps as best illustrated in FIGS. 16, 17A and 17B, system 100 preferably comprises ground support unit 10 disposed at least partially underneath source equipment 1 to support it off the ground and provide a structure on which receptacles 1a and adaptors 1b may be disposed and/or through which cables 2 may pass.

FIG. 16 illustrates an example of system 100 as used with two source equipment 1. Each cable 2 comprises plugs 2a on each of their ends, and each cable 2 electrically connects source equipment 1 to destination equipment 6. Destination equipment 6 is disposed on skid 5 along with transformer 7. Source equipment 1 is disposed on ground support unit 10. As the enhanced view on the bottom left illustrates, receptacles 1a on source equipment 1 appears flush with the end of ground support unit 10 (that is, the majority of its length extends below and not out from under the length of source equipment 1 or ground support unit 10), so that plug 2a can plug into it without extending below source equipment 1. In such case, while preferably the majority of the length of receptacle 1a is disposed below source equipment 1 and/or within ground support unit 10, receptacles 1a may extend at least partially out from under source equipment 1 or ground support unit 10, at least just enough to make the ends of receptacles easily accessible and visible to receive plug 2a.

In another embodiment, as shown in FIGS. 17A and 17B, receptacle 1a and/or adaptor 1b are disposed entirely within ground support unit 10 and entirely below source equipment 1. In such case, cable 2 extends within ground support unit 10 and underneath source equipment 1 to connect with adaptor 1b.

Preferably, ground support unit 10 comprises at least two beams 11 oriented substantially parallel to each other and joined together by at least one supporting member 12. Beams 11 form a cavity, space or void extending at least partially along and below the entire length and width of source equipment 1. The particular dimensions of ground support unit 10 may vary depending on the intended source equipment 1, but preferably, the length of each ground support unit 10 is such that it can be transported on commercially available vehicles, as described in further detail below. Since ground support unit 10 may comprise any number of beams 11. While it is preferred that ground support unit 10 comprises two beams 11 that are parallel to each other to make transportation easier (as will be discussed more thoroughly herein), in some embodiments, beams 11 are not parallel with each other, but directed at angles with respect to each other for different reasons, for example to account for varying load densities of certain source equipment 1 or variations in the size of source equipment 1. Preferably the beams are pre-engineered structural grade beams formed, extruded or molded from structural-grade materials, including but not limited to steel, reinforced concrete, structural HDPE, etc., and combinations thereof.

Ground support unit 10 preferably comprises a mechanical anchoring system 13. The mechanical anchoring system preferably comprises screws for securing beams 11 to the ground extending from the top through the bottom of each beam 11 or on flanges thereof. In another embodiment, beams 11 are secured directly to the earth by structural earth screws, mechanically connected to drilled structural piers and/or to a steel reinforced concrete pad. Mechanical anchoring system 13 is not limited to screws, but in some embodiments comprises other mechanical securing devices, including but not limited to bolts, rods, anchors, bars, columns, etc.

Methods of Assembly and Installation

One of the objectives of the present invention is to provide methods of installing all of the electrical connections necessary to connect source equipment 1 to the point of delivery out of the power facility. To that end, this application describes various methods of pre-fabricating the components. Some of those methods or steps thereof are described above, and additional methods are described in this section. The methods of the present invention enable all of the complex services, customizations or assembling that is traditionally performed on the site of the power facility to be performed prior to delivery to the power facility. Once delivered to the power generation facility, the various components herein only need to be "plugged in" to each other and to source equipment 1.

Methods in which Collection Hub 3 is not Integrated with Destination Equipment 6

As discussed above, in some embodiments of the present invention, collection hub 3 is physically a separate and independent object from destination equipment 6 and power conversion station skid 5 (while still being electrically connected to it via cable 4), particularly in embodiments in which it is intended to dispose collection hub 3 on the other side of a road from power conversion station skid 5. Various methods of fabrication and installation of a system 100 of this type are described herein.

In one method of assembling system 100 according to the present invention, prior to delivery to the power generation facility, power conversion station skid 5 is assembled to include destination equipment 6, and any and all connections between destination equipment 6 and transformer 7 (for example, connection 6a), integrated with power conversion station skid 5 or otherwise attached to it. Preferably, any and all of the electrical equipment necessary to convert the output of collection hub 3 to the desired output for delivery of the power out of the power generation facility would be disposed on, integral with, or attached to power conversion station skid 5. Also prior to delivery to the power generation facility, collection hub 3 is preferably electrically connected with destination equipment 6 using cable 4, cable 4 rolled up into or onto a spool that is provided with power conversion station skid 5 so that once delivered to the power generation facility, the spool of cable 4 simply needs to be unrolled to place collection hub 3 in its desired location at the power generation facility without even needing to connect cable 4 with destination equipment 6. The length of cable 4 may be customized to the particular application or one of standard length discussed above. It may be that prior to delivery to the power facility, cable 4 is manufactured to a pre-determined specification related to the dimensions of the power facility.

Prior to delivery of system 100 to the power generation facility, at least one source equipment 1 is manufactured to comprise at least one receptacle 1a. Such can be accomplished either by the original equipment manufacturer of source equipment 1 or by the assembling entity that modifies source equipment 1 to include receptacle 1a. For example, receptacle 1a may be retrofitted to source equipment 1 by installing plate 11 that is retrofitted to a side or surface of source equipment 1, which plate 11 comprises receptacle 1a. Preferably, source equipment 1 is fabricated to comprise at least one receptacle 1a prior to delivery to the power generation facility. In this way, power conversion station skid 5 can be delivered together with source equipment 1 so that system 100 provides all components necessary to connect source equipment 1 to the point of delivery out of the power facility, without having to make a modification to source equipment 1 in the field.

System 100, subsequent to its assembly, is delivered to the power facility. Since power conversion station skid 5 is provided together with collection hub 3, cable 4, destination equipment 6, and transformer 7, all of such is preferably shipped on the same vehicle. Installation preferably comprises the following steps. Power conversion station skid 5 is disposed at or near a road for access to maintain it. A trench is dug at or near where power conversion station skid 5 will be located, the trench having dimensions at least greater than the dimensions of cable 4. The trench may need to cross or pass under the road. Power conversion station skid 5 is placed at or near the trench and at least partially over it so that cable 4 can extend down into the trench and be at least partially contained within the trench. If cable 4 is provided on a spool with power conversion station skid 5, collection hub 3 and cable 4 is unrolled from power conversion station skid 5 and placed in its intended location on the ground such that cable 4 rests within the trench. The desired number of source equipment 1 are placed at their desired locations. Each source equipment 1 is electrically connected to collection hub 3 by connecting plug 2a at a first end of each cable 2 into receptacle 1a of source equipment 1 and by connecting a second plug 2a at the second end of each cable 2 with receptacle 3a of collection hub 3. A trench need not be dug for cable 2 since in most cases it will be intended that cable 2 be above the ground. By simply using plugs 2a to make the connection of cable 2 between source equipment 1 and collection hub 3, all of the electrical connections necessary to connect source equipment 1 to destination equipment 6 for production of power out of the power generation facility will have been made and system 100 is ready for operation.

Methods in which Collection Hub 3 is Integrated with Destination Equipment 6

In another method of assembling system 100 according to the present invention, prior to delivery to the power facility, power conversion station skid 5 is assembled to include, collection hub 3, destination equipment 6, and any and all connections between destination equipment 6 and transformer 7 (for example, connection 6a), integrated with power conversion station skid 5 or otherwise attached to it. Preferably, any and all of the electrical equipment necessary to convert the output of collection hub 3 to the desired output for delivery of the power out of the power generation facility would be disposed on, integral with, or attached to power conversion station skid 5.

Prior to delivery of system 100 to the power facility, at least one source equipment 1 is manufactured to comprise at least one receptacle 1a. Such can be accomplished either by the original equipment manufacturer of source equipment 1 or by the assembling entity that modifies source equipment 1 to include receptacle 1a. For example, receptacle 1a is retrofitted to source equipment 1 by installing plate 11 that is retrofitted to a side or surface of source equipment 1, which plate 11 comprises receptacle 1a. Preferably, source equipment 1 is fabricated to comprise at least one receptacle 1a prior to delivery to the power generation facility. In this way, power conversion station skid 5 can be delivered together with source equipment 1 so that system 100 provides all components necessary to connect the power produced by solar PV modules 8 to the point of delivery out of the power facility, without having to make a modification to source equipment 1 in the field.

System 100, subsequent to assembly, is delivered to the power generation facility. Since power conversion station skid 5 is an integral unit with collection hub 3, destination equipment 6, and transformer 7, all of such is preferably shipped on the same vehicle. Power conversion station skid 5 is disposed at or near a road for access to maintain it. Power conversion station skid 5 is placed at its desired location at the power generation facility. The desired number of source equipment 1 are placed at their desired locations at or near source equipment 1. Each source equipment 1 is electrically connected to collection hub 3 by connecting plug 2a at a first end of each cable 2 into receptacle 1a of source equipment 1 and by connecting a second plug 2a at the second end of each cable 2 with receptacle 3a of collection hub 3. By simply using plugs 2a to make the connection of cable 2 between source equipment 1 and collection hub 3, all of the electrical connections necessary to connect source equipment 1 to destination equipment 6 for production of power out of the power facility will have been made and system 100 is ready for operation.

Note that in the specification and claims, "about" or "approximately" means within twenty percent (20%) of the numerical amount cited.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

What is claimed is:

1. A method of electrically connecting electrical energy storage or photovoltaic equipment with electrical destination equipment at an electric power generation or storage facility ("power facility"), the method comprising the step of:
providing a plate capable of retrofitting to a side or surface of a first source equipment, the plate comprising a first receptacle capable of connecting to the electrical output of a first source equipment, the first source equipment comprising a plurality of electrical energy storage systems or photovoltaic inverters, each of the electrical energy storage systems and photovoltaic inverters with a capacity or output typically employed for use with utility-scale power sources, the first receptacle shaped and sized to secure to a first plug on a first cable to form an electrical connection between the first source equipment and the first cable;
providing a first cable comprising the first plug on a first end of the first cable, the first plug shaped and sized to secure to the first receptacle to form an electrical connection between the first source equipment and the first cable, the first cable capable of electrical connection with destination equipment at a power facility, the destination equipment comprising at least one of the electrical equipment chosen from the group consisting of: transformer, inverter, switch, switch gear, panel board, circuit breaker and meter.

2. The method of claim 1, further comprising subsequently delivering or otherwise providing the source equipment to the power facility comprising the destination equipment.

3. The method of claim 1, further comprising the step of securing the first plug to the first receptacle on the first source equipment to form an electrical connection between the destination equipment and the first cable.

4. The method of claim 1, wherein the first plug comprises a locking mechanism to lock and seal the connection.

5. The method of claim 1 further comprising the step of electrically connecting the first cable to the first source equipment without performing any hard-wiring or installing any terminations on the first cable, first source equipment or destination equipment.

6. The method of claim 1 further comprising the step of electrically connecting the first cable to the first source equipment without adding any lugs to the first cable, first source equipment or destination equipment.

7. The method of claim 1 further comprising the step of electrically connecting the first cable to the first source equipment without using a hand tool.

8. The method of claim 1, wherein the first receptacle comprises an asymmetrical shape.

9. The method of claim 1, wherein the first receptacle comprises a tab or slot.

10. The method of claim 1, further comprising the step of securing the first plug to the first receptacle and removing the first plug secured to the first receptacle on the first source equipment by using a hand tool to unsecure the first plug.

* * * * *